US 8,583,757 B2

(12) United States Patent
Takaoka et al.

(10) Patent No.: US 8,583,757 B2
(45) Date of Patent: Nov. 12, 2013

(54) DATA PROCESSING METHOD AND COMPUTER SYSTEM

(75) Inventors: Nobumitsu Takaoka, Sagamihara (JP); Masaaki Iwasaki, Tachikawa (JP); Naoki Utsunomiya, Machida (JP); Yoshiki Kano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 562 days.

(21) Appl. No.: 12/810,707

(22) PCT Filed: May 31, 2010

(86) PCT No.: PCT/JP2010/003626
§ 371 (c)(1),
(2), (4) Date: Jun. 25, 2010

(87) PCT Pub. No.: WO2011/151852
PCT Pub. Date: Dec. 8, 2011

(65) Prior Publication Data
US 2011/0295968 A1 Dec. 1, 2011

(51) Int. Cl.
*G06F 15/167* (2006.01)
(52) U.S. Cl.
USPC .......................................... 709/213; 709/217
(58) Field of Classification Search
USPC ........................................................ 709/213
See application file for complete search history.

(56) References Cited

U.S. PATENT DOCUMENTS

| 6,567,806 B1 | 5/2003 | Tsuchida et al. |
| 7,475,199 B1 | 1/2009 | Bobbitt et al. |
| 7,917,495 B1* | 3/2011 | Chapman et al. ............ 707/713 |
| 2005/0010682 A1 | 1/2005 | Amir et al. |
| 2010/0095303 A1 | 4/2010 | Archer et al. |
| 2010/0131545 A1* | 5/2010 | Srivastava et al. ............ 707/769 |
| 2011/0161294 A1* | 6/2011 | Vengerov et al. ............. 707/637 |
| 2012/0016901 A1* | 1/2012 | Agarwal et al. ............... 707/769 |

FOREIGN PATENT DOCUMENTS

JP 2000-330959 11/2000

OTHER PUBLICATIONS

Apache architecture and design specification 'The Hadoop Distributed File System: Architecture and Design' (copyright 2007) to Borthakur. ("Borthakur").*
Specification 'Hadoop Documentation Release 0.2.2' (2009): [URL: http://hadoop.apache.org/docs/r0.22.0/ ] to Hadoop. ("Hadoop").*
Technical user guide Amazon Elastic MapReduce Developer Guide API version (Nov. 30, 2009) to Amazon Web Services (AWS). ("AWS").*
VLDB 2009 paper Hive-A warehousing solution over a map-reduce framework (2009) to Thusoo et al. ("Thusoo").*
International Search Report in International Application No. PCT/JP2010/003626 mailed Feb. 25, 2011.

* cited by examiner

*Primary Examiner* — Phuoc Nguyen
*Assistant Examiner* — June Sison
(74) *Attorney, Agent, or Firm* — Brundidge & Stanger, P.C.

(57) ABSTRACT

A technique for increasing the speed of data entry into a distributed processing platform is provided. According to a computer system of the present invention, when data is entered into each node in a distributed manner, the most efficient entry method (a method with the highest processing speed) is selected from among a plurality of entry methods, so that the data is entered into each node with no overlaps in accordance with the selected method.

15 Claims, 18 Drawing Sheets

| | Data Entry Server | Direct Entry | |
|---|---|---|---|
| Total Volume of Data to be Sent via LAN | 220G | 0 | 403 |
| Total Volume of Data to be Sent via SAN | 200G | 300G | 404 |
| Estimated Time | 2100S | 1500S | 405 |
| Select | ○ | ● | 406 |

Data Entry — 400, 401, 402 — 40

Conditions: Date=2/1/2010 to 2/28/2010 — 410

Option:
☑ Activate Direct Entry
421

422 — Estimate    Start — 423

DATA PROCESSING METHOD AND COMPUTER SYSTEM

TECHNICAL FIELD

The present invention relates to a data processing method and a computer system, and for example, to a technique for entering data to be processed into a distributed processing platform which is connected to data storage.

BACKGROUND ART

In recent years, parallel processing platforms have been developed with which a plurality of computers (hereinafter also referred to as nodes) is connected in parallel using a local area network (LAN) or the like so that a large volume of data can be processed in parallel in a short time. For example, there is known a parallel processing platform called "Hadoop." Hadoop builds a distributed file system using a plurality of computers so that data stored in the distributed file system can be subjected to distributed processing. As an example of typical applications, creating search indexes is known. Hadoop is also considered to be one of the effective methods for analyzing a large volume of data in a short time. To implement the Hadoop, however, it is necessary to store data in a distributed manner from storage as a precondition to performing parallel processing.

A case in which a large volume of data is analyzed is described below. First, data to be processed is entered into the distributed processing platform. This data is obtained by extracting data to be analyzed from a data source (e.g., a database), which is not included in the distributed processing platform, and translating it into a form that can be processed by the distributed processing platform. Translation and entry of such data are performed by one of the computers that constitute the distributed processing platform or by another computer.

The entered data is stored in the distributed file system made up of storage devices (e.g., hard disk drives) of computers that constitute the distributed processing platform. At this time, the data is divided into blocks of a given size before being stored in each computer. Thereafter, each computer performs analytical processing to its associated partial data. The associated partial data is, in many cases, data that has been obtained by dividing the original data into blocks and storing each data block in the storage device of each computer. The result of the analytical processing executed by each computer is merged again as a single output result by the distributed processing platform for storage in the distributed file system.

As one of the distributed processing techniques, there is known a technique called a distributed database. For example, Patent Literature 1 discloses a method for building a database system with a plurality of computers.

CITATION LIST

Patent Literature

PTL 1: JP Patent Publication (Kokai) No. 2000-330959 A

SUMMARY OF INVENTION

Technical Problem

As described above, when data is processed with a distributed processing platform, the data to be processed should be entered into the distributed processing platform in advance. In such a case, however, if the throughput of a network used for the data entry is low, the data entry would take a long time.

In the distributed database such as the one described in Patent Literature 1, search processing can be executed in parallel to the database that has been divided into a plurality of segments in advance. However, it is not necessarily the case that the source data that should be entered into the distributed processing platform is stored in the distributed database.

The present invention has been made in view of the foregoing, and provides a technique for increasing the speed of data entry into a distributed processing platform.

Solution to Problem

In order to solve the aforementioned problems, according to a computer system of the present invention, when data is entered into each node in a distributed manner, the most efficient entry method (a method with the highest processing speed) is selected from among a plurality of entry methods, so that the data can be entered with no overlaps into each node in accordance with the selected method.

More specifically, the data entry server (1) estimates the processing time required to execute each of the first and second data entry methods, and selects one of the first and second data entry methods based on the estimated processing time. Then, the data entry server (1) or a plurality of nodes (3) executes data entry processing based on the selected data entry method.

The first data entry method herein is a method in which the data entry server (1) reads data from the logical volume (28) in response to a data entry request from a user, and then divides the data into a plurality of blocks and sends the data blocks to the plurality of nodes (3) with no overlaps. More specifically, the data entry server (1) obtains all or part of data in a given column of a database (29) included in the logical volume (28), identifies data to be read using the data in the column, obtains the identified data from the database (29), and distributes the obtained data to the plurality of nodes (3).

Meanwhile, the second data entry method is a method in which the plurality of nodes (3), in response to an instruction from the data entry server (1), reads data from the logical volume 28 with no overlaps by dividing the data into a plurality of blocks. More specifically, the second data entry method includes (i) a method in which the data entry server (1) obtains all or part of data in a given column of the database (29) included in the logical volume (28), identifies data to be read using the data in the column, and sends information on the identified data to the plurality of nodes (3), so that the plurality of nodes (3) obtains the identified data from the database (29), and (ii) a method in which the plurality of nodes (3) obtains all or part of data in a given column of the database (29) included in the logical volume (28), identifies data to be read using the data in the column, and obtains the identified data from the database (29).

Further features of the present invention will become apparent from the following embodiments and accompanying drawings for carrying out the present invention.

Advantageous Effects of Invention

According to the present invention, an optimal method for entering data into a distributed processing platform can be selected and executed, whereby the speed of data entry into the distributed processing platform can be increased as compared to that of the conventional techniques.

BRIEF DESCRIPTION OF DRAWINGS

FIG. 8 is a diagram showing the configuration of a database 29 of the present invention.

FIG. 17 is a diagram showing a management screen 40 that displays a user interface in accordance with the present invention.

DESCRIPTION OF EMBODIMENTS

Figure 1:
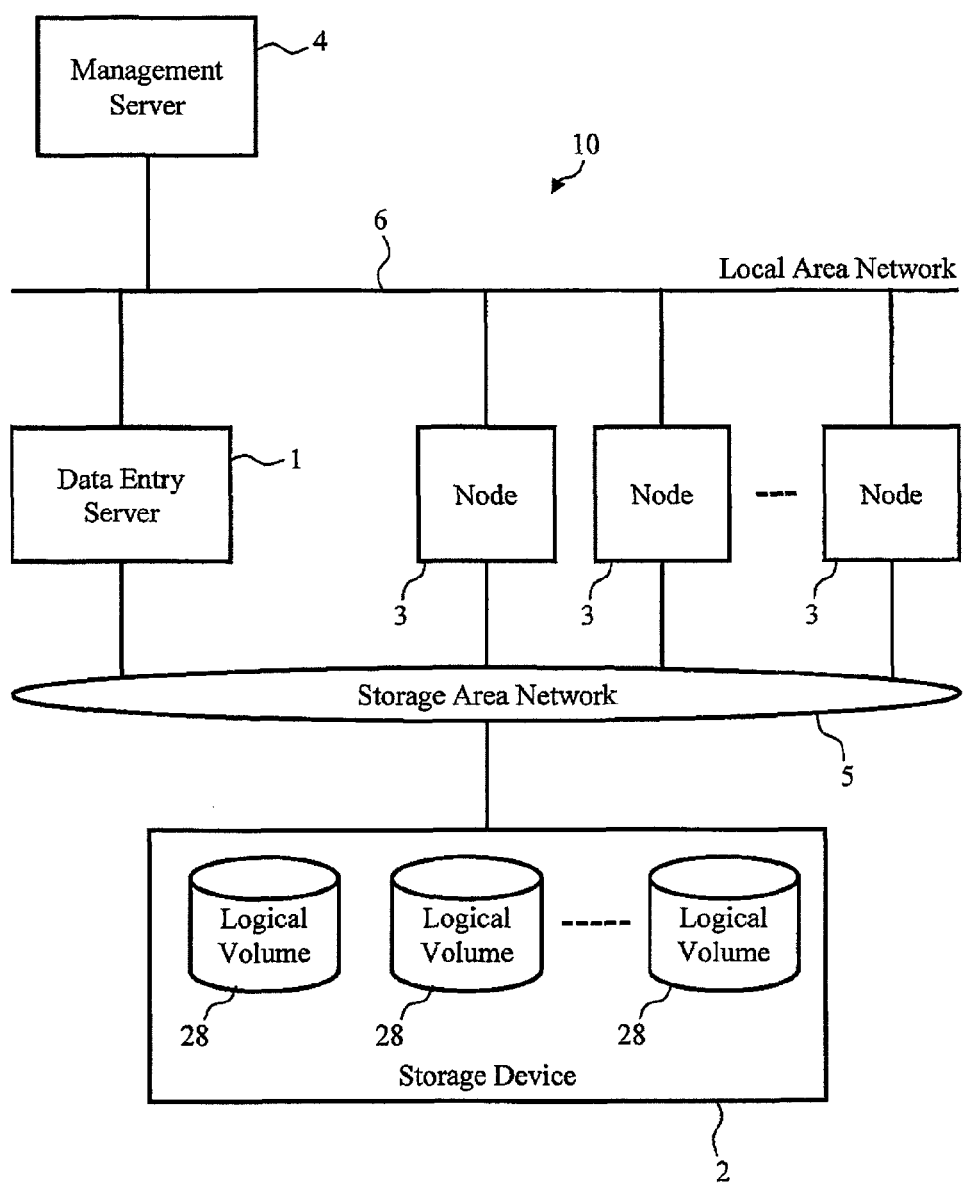
FIG. 1 is a diagram showing the schematic configuration of a computer system 10 in accordance with the first embodiment of the present invention.

The present invention discloses a technique for, in the field of data storage techniques, increasing the speed of entering data to be processed into a distributed processing platform.

Hereinafter, embodiments of the present invention will be described with reference to the accompanying drawings. It should be noted that the following embodiments are only illustrative for carrying out the present invention and are not intended to limit the technical scope of the present invention.

Structures that are common throughput the drawings are assigned the same reference numerals. It should also be noted that a "program" as referred to in this specification and drawings is configured to operate such that once a code described in the program is read by a processor, the program executes given processing. However, it is also possible to implement the processing that should be executed by a program as a module so that each module can execute given processing.

Embodiment 1

(1) First Embodiment

<Configuration of a Computer System>

FIG. 1 is a diagram showing the schematic configuration of a computer system 10 in accordance with this embodiment of the present invention. The computer system 10 includes a data entry server 1, a storage device 2, a plurality of nodes 3, a management server 4, a storage area network (hereinafter, SAN) 5, and a local area network (hereinafter, LAN) 6.

The data entry server 1 and the plurality of nodes 3 are connected to the management server 4 via the LAN 6 in a mutually communicable manner. In addition, the data entry server 1 and the plurality of nodes 3 are connected to the storage device 2 via the SAN 5.

The storage device 2 includes a plurality of logical volumes 28. Each logical volume 28 is accessible as a block device from the data entry server 1 and the nodes 3 via the SAN 5. Each of one or more of the logical volumes 28 has stored therein a database that is the source of data to be processed by the distributed processing platform (each node).

The plurality of nodes 3 are computers that constitute the distributed processing platform. The data entry server 1 controls a mechanism for entering into the distributed processing platform, which is built from the plurality of nodes 3, data to be processed by the distributed processing platform. The management server 4, in response to a user's request, instructs the data entry server 1 to enter the data requested by the user into the distributed processing platform. As described below, the data entry server 1 supports a plurality of methods as the methods for entering data into the distributed processing platform.

The SAN 5 is a FC-SAN using Fibre Channel, an IP-SAN using iSCSI, an FCoESAN using FCoE (Fiber Channel over Ethernet (Registered Trademark)), or a network using other protocols. It should be noted that the LAN 6 can combine the function of the SAN 5.

In the computer system 10 shown in FIG. 1, methods for selectively entering, in response to a request, data on the database stored in the logical volume 28 into the distributed processing platform, which is built from the plurality of nodes 3, are broadly divided into the two following methods.

The first method is a method in which the data entry server 1 accesses the logical volume 28 to obtain desired data, translates the form of the obtained data, and enters the data into the distributed processing platform. When such a data entry method is used, a total processing time required for the data entry server 1 to access the logical volume 28 to obtain data and to enter the data into the distributed processing platform can be long (though such processing time can be reduced if parallel processing is possible).

The second method is a method in which each node 3 individually searches the database and obtains data with no overlaps. This data entry method will take a long time for the nodes 3 to access the logical volume 28. Although data is not sent from the data entry server 1 via the LAN 6, the volume of data read from the logical volume 28 could be increased as compared to that of the first method because each node 3 individually searches the database and thus data necessary to determine the search conditions is sent with overlaps to each node 3.

According to the present invention, when data is entered into the distributed processing platform, the processing time required to execute each of the aforementioned methods is estimated in advance, so that a data entry method with a shorter processing time is selected and executed.

<Data Entry Server>

Figure 2:
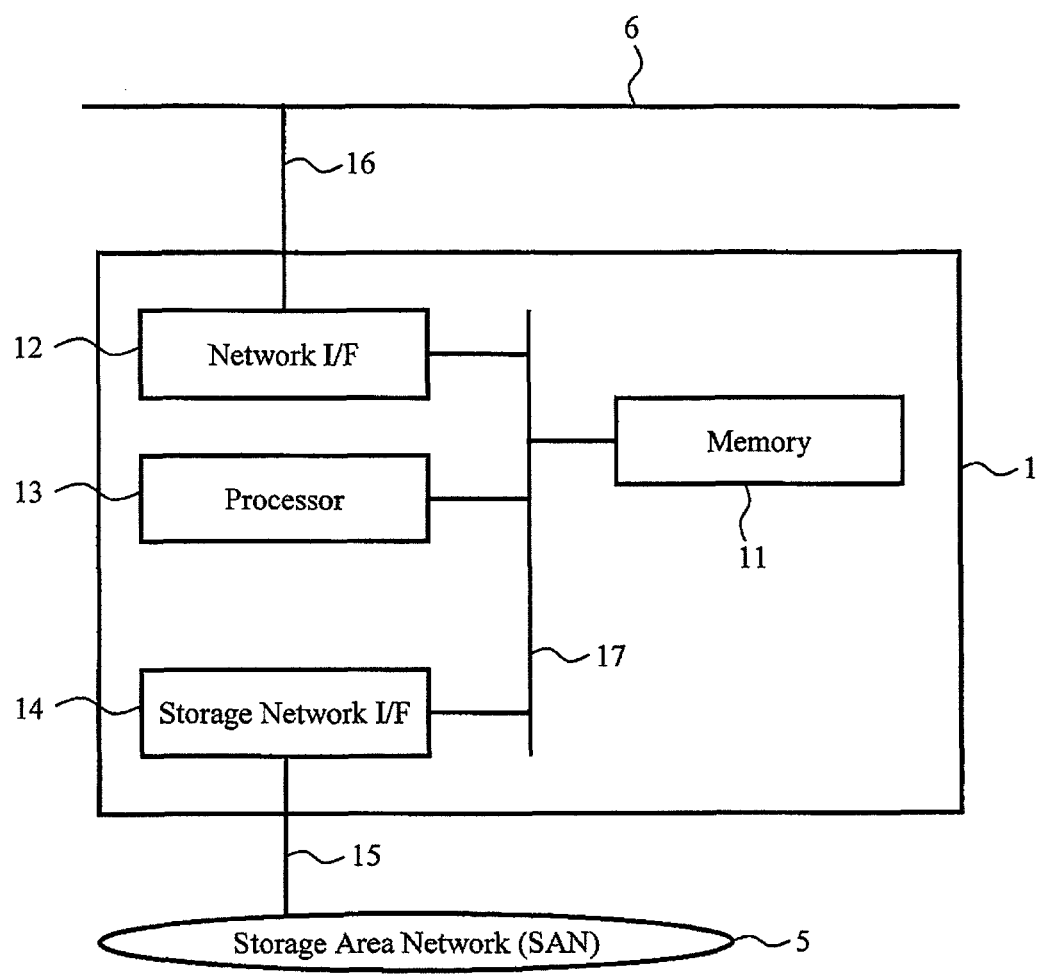
FIG. 2 is a diagram showing the internal configuration of a data entry server 1 in accordance with the present invention.

FIG. 2 is a diagram showing the schematic configuration of the data entry server 1 in accordance with this embodiment of the present invention. The data entry server 1 includes memory 11, a network interface (hereinafter, an interface shall be referred to as I/F) 12, a processor 13, and a storage network I/F 14. Such components are mutually connected via an interconnect 17.

The processor 13 executes various processing using various programs and various data stored in the memory 11. The network I/F 12 is connected to the LAN 6 via a communication channel 16 and controls communication performed via the LAN 6. The storage network I/F 14 is connected to the SAN 5 via a communication channel 15 and controls communication performed via the SAN 5.

More than one memory 11, processor 13, network I/F 12, storage network I/F 14, and communication channels 15 and 16 can be provided. In addition, the data entry server 1 can be provided with a storage device (e.g., a hard disk drive) for storing various data. The network I/F 12 can combine the function of the storage network I/F 14.

<Memory Internal Structure of Data Entry Server>

Figure 3:
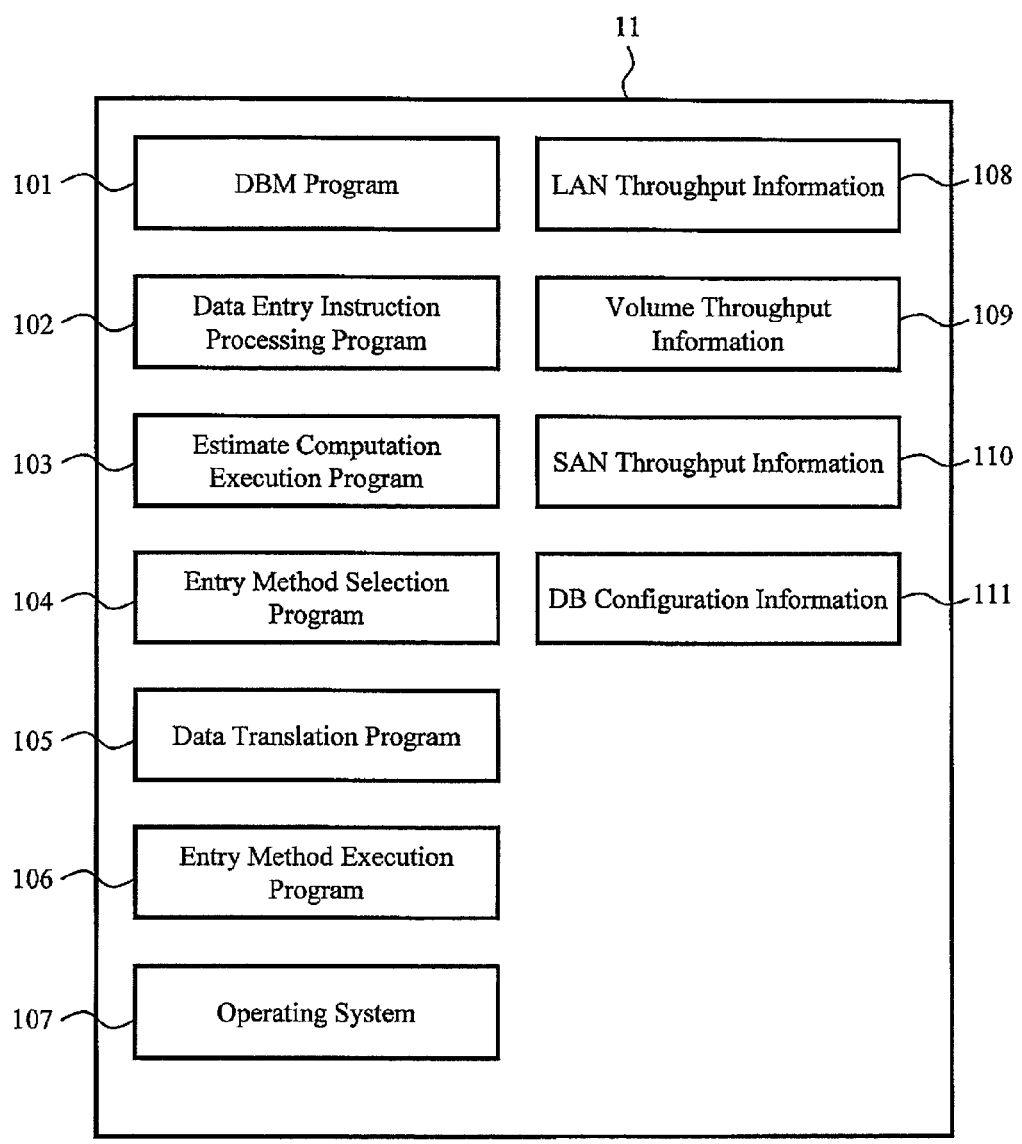
FIG. 3 is a diagram showing programs and data stored in memory 11 of the data entry server 1 in accordance with the present invention.

FIG. 3 is a diagram showing programs and data stored in the memory 11 of the data entry server 1 in accordance with this embodiment of the present invention.

The memory 11 has stored therein a DBM (database management) program 101, a data entry instruction processing program 102, an estimate computation execution program 103, an entry method selection program 104, a data translation program 105, an entry method execution program 106, an operating system 107, LAN throughput information 108, volume throughput information 109, SAN throughput information 110, and DB configuration information 111.

The DBM program 101 is a program configured to manage the database, and controls data entry into and data output from a database 29 (e.g., information shown in the items of FIG. 8) stored in the logical volume 28 of the storage device 2. The database 29 has stored therein data (source data) that is the source of data to be processed by the distributed processing platform.

The data entry instruction processing program 102 is a program configured to receive an instruction from the management server 14 to enter data into the distributed processing platform.

The estimate computation execution program 103 is a program configured to, before data is entered into the distributed processing platform (each node), estimate the time required to enter the data. The entry method selection program 104 is a program configured to determine a data entry method.

The data translation program 105 is a program configured to obtain data stored in the database 29 from the DBM program 101 and translate the data into a data form to be processed by the distributed processing platform. This is because, in order to cause the distributed processing platform to process data, it would be necessary to, for example, merge the obtained data into a single file by translating the data form into a given form, or decompress the compressed data before transferring such data to the distributed processing platform.

The entry method execution program 106 is a program configured to execute the method for entering data into the distributed processing platform that has been selected by the entry method selection program 104.

The operating system 107 is an operating system program configured to control the data entry server 1.

The LAN throughput information 108 is information related to the throughput performance when the data entry server 1 enters data into the distributed processing platform via the communication channel 16 and the LAN 6. Such a value is, for example, 2 Gbps (2 gigabits per second) and can be any of the following: a value measured after actually entering data into the distributed processing platform in advance, a fixed value entered into the management server (management computer) 4 by a user, an instantaneous measured value that is variable, and a mean value thereof.

The volume throughput information 109 is information related to the throughput performance when data is read from the logical volume 28 (the volume of data that can be read per second).

As the DB configuration information 111, information related to the configuration of the database 29 is stored. Examples of the configuration information of the database 29 herein include the number of records stored in the database 29, the size (bytes) of each record, and the size (bytes) of each column including the records (see FIG. 8).

<Node>

Figure 4:
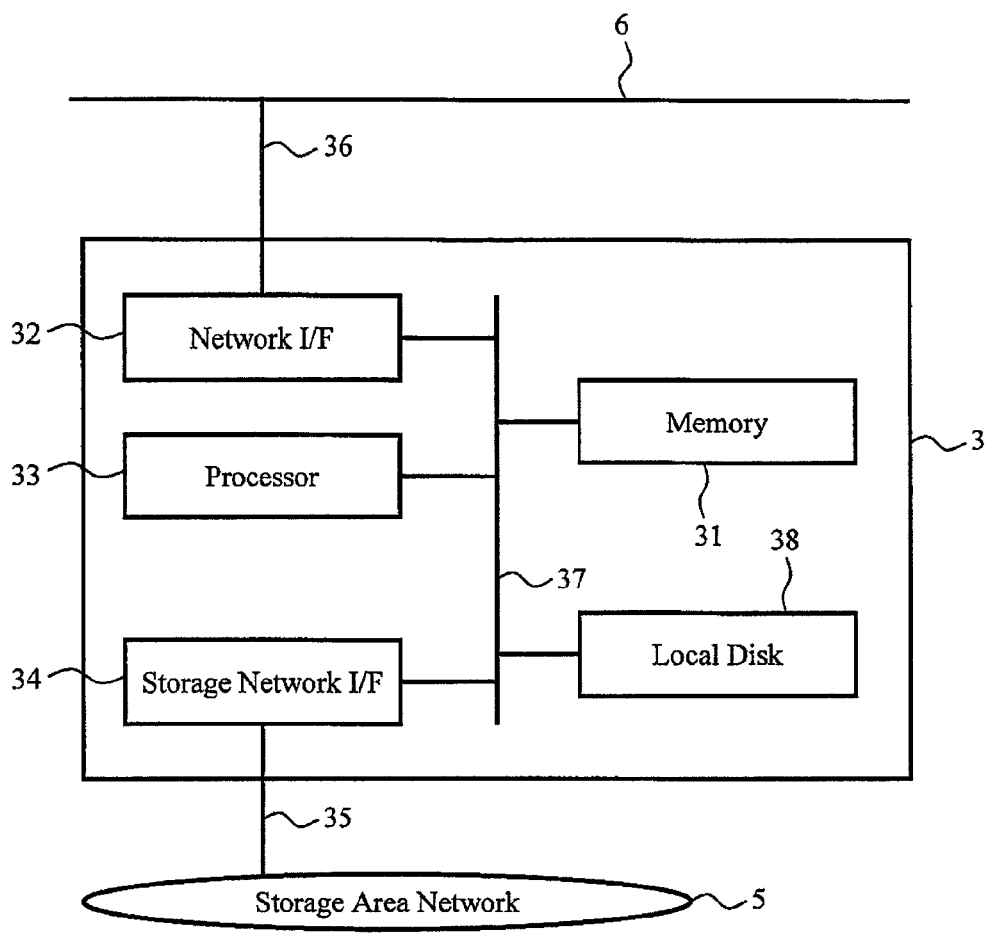
FIG. 4 is a diagram showing the internal configuration of a node 3 of the present invention.

FIG. 4 is a diagram showing the schematic configuration of each node 3 in accordance with this embodiment of the present invention. The node 3 includes memory 31, a network I/F 32, a processor 33, a storage network I/F 34, and a local disk device 38. Such components are mutually connected via an interconnect 37.

The processor 33 executes various processing using various programs and various data stored in the memory 31. The network I/F 32 is connected to the LAN 6 via a communication channel 36 and controls communication performed via the LAN 6. The storage network I/F 34 is connected to the SAN 5 via a communication channel 35 and controls communication performed via the SAN 5.

The local disk device 38 has stored therein various programs to be executed by the node 3 and data necessary to execute the programs. The local disk device 38 also has stored therein data for building a distributed file system.

It should be noted that more than one memory 31, processor 33, network I/F 32, storage network I/F 34, local disk device 38, and communication channels 35 and 36 can be provided. The network I/F 32 can combine the function of the storage network I/F 34.

<Memory Internal Structure of the Node>

Figure 5:
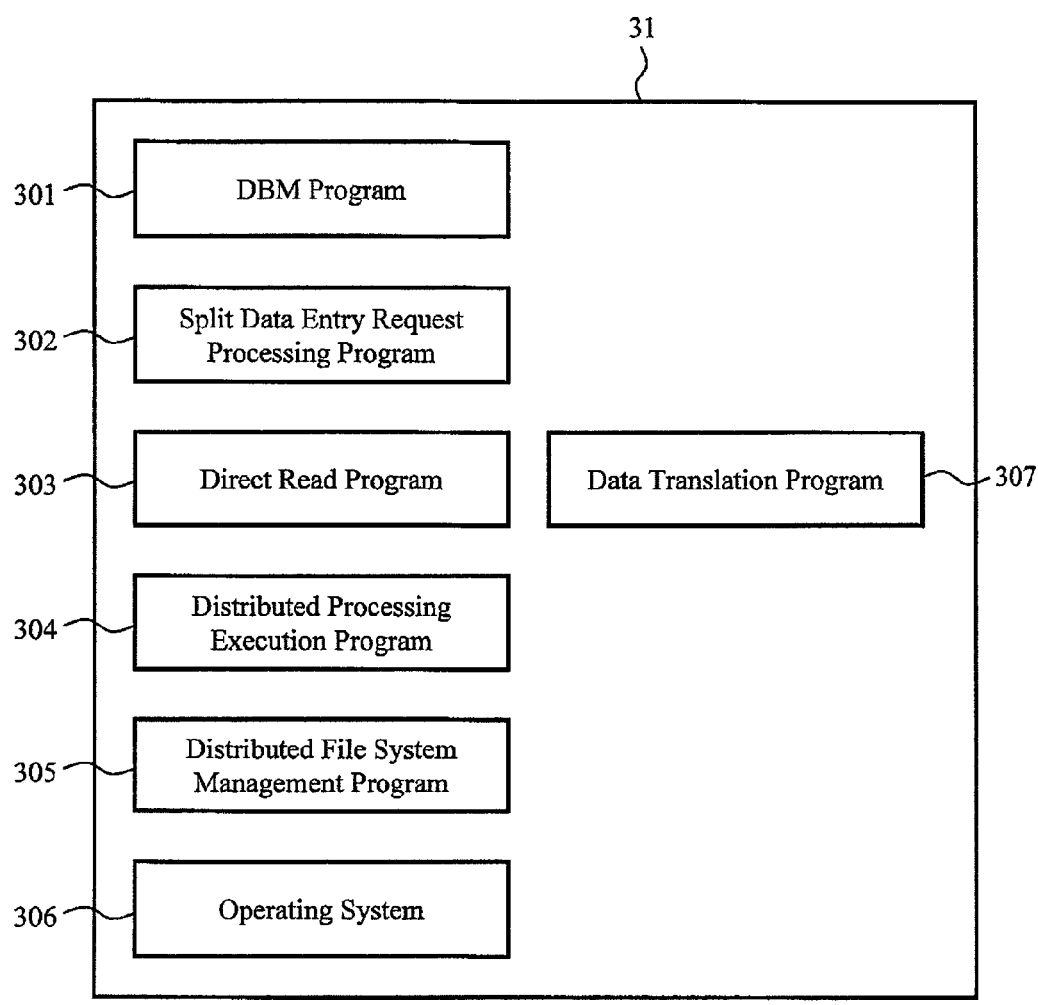
FIG. 5 is a diagram showing programs stored in memory 31 of the node 3 of the present invention.

FIG. 5 is a diagram showing the structure of each program and data stored in the memory 31 of the node 3 in accordance with this embodiment of the present invention.

The memory 31 has stored therein a DBM program 301, a split data entry request processing program 302, a direct read program 303, a distributed processing execution program 304, a distributed file system management program 305, an operating system 306, and a data translation program 307.

The DBM program 301 is a program configured to manage the database as with the DBM program 101, and is used for the node 3 to read data stored in the database 29. The DBM program 301 is, when each node 3 has received a data read instruction (e.g., SQL (Structured Query Language)) from the data entry server 1, caused to operate by the processor 33 based on the instruction.

The split data entry request processing program 302 is a program configured to receive a data entry request sent from the data entry server 1.

The direct read program 303 is a program configured to read data to be processed from the database 29 using the DBM program 301.

The distributed processing execution program 304 is a program configured to execute distributed processing. This program processes data that has been obtained in response to an instruction from the data entry server 1, and then writes the processing result to the distributed file system (local disk device). Accordingly, the processing result is stored in the local disk device 38 or is transferred to another node 3.

The distributed file system management program 305 is a program configured to manage the distributed file system. With this program, the local disk device 38 (or part of it) constitutes a single name space, so that each node 3 and the data entry server 1 can refer to files stored in the distributed file system.

The operating system 306 is an operating system program configured to control the node 3.

The data translation program 307 is a program configured to translate the data stored in the database 29, which has been obtained with the use of the DBM program 301, into a data form to be processed by the distributed processing platform (the distributed processing execution program 304). It should be noted that the data translation program 307 operates upon directly receiving data from the database 29. Thus, the data translation program 307 may not operate depending on data entry methods.

<Storage Device>

Figure 6:
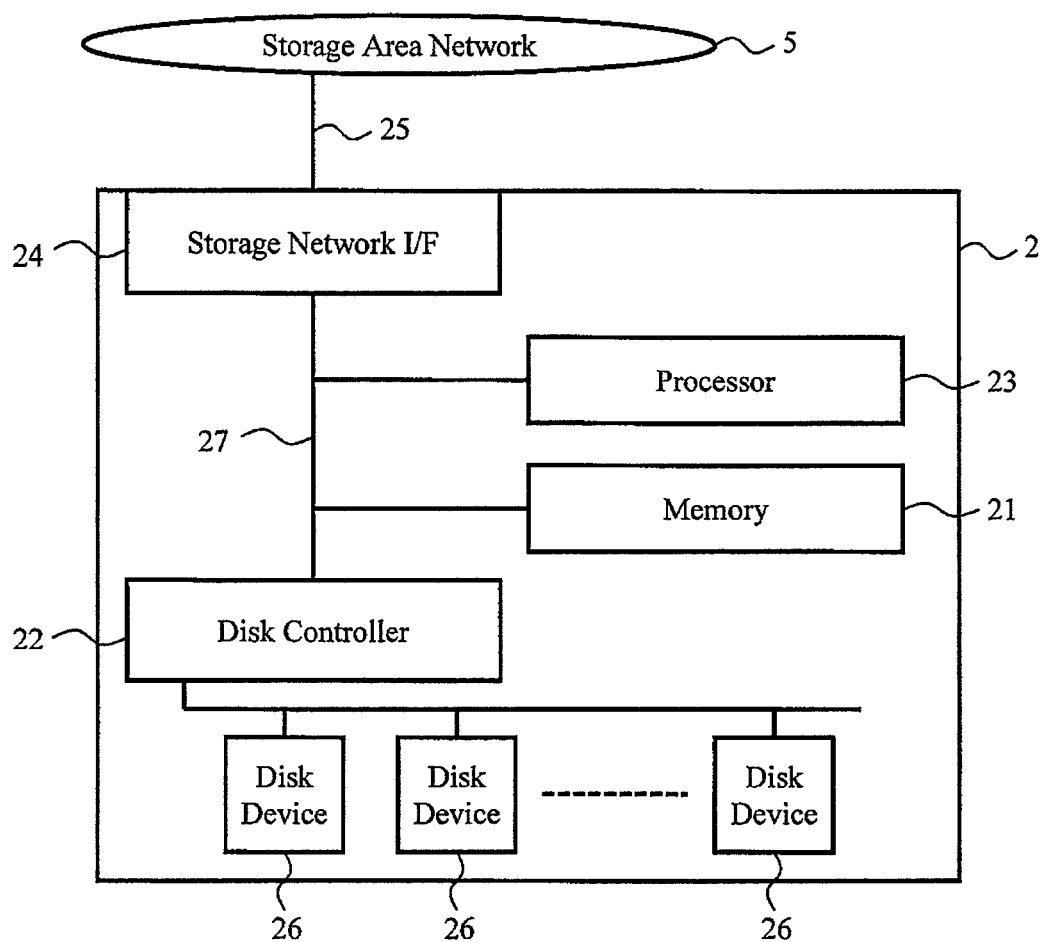
FIG. 6 is a diagram showing the internal configuration of a storage device 2 of the present invention.

FIG. 6 is a diagram showing the schematic configuration of the storage device 2 in accordance with this embodiment of the present invention. The storage device 2 includes memory 21, a disk controller 22, a processor 23, a storage network I/F 24, and a plurality of disk devices 26. The memory 21, the disk controller 22, the processor 23, and the storage network I/F 24 are connected with an interconnect 27. The plurality of disk devices 26 is connected to the disk controller 22. The storage network I/F 24 is connected to the SAN 5 via a communication channel 25.

The memory 21 has stored therein programs to be executed by the processor 23 and data used by the programs. The memory 21 is also used for each of the processor 23, the disk controller 22, and the storage network I/F 24 to mutually exchange data.

The processor 23 executes processing in response to a request from a computer connected to the storage device 2 to read data from or write data to the logical volume 28 and also executes various other processing.

The disk controller 22 reads data from or writes data to the disk devices 26 in response to a request from the processor 23.

The storage network I/F 24 controls communication between the storage device 2 and a computer connected thereto.

The disk device 2 is, for example, a hard disk drive, a solid state drive (SSD), or other types of storage devices.

It should be noted that more than one memory 21, disk controller 22, and storage network I/F 24 can be provided.

<RAID Group>

The storage device 2 has a plurality of disk devices (26a to 26e) that constitutes a RAID group. RAID is an acronym for Redundant Array of Independent Disks, and is widely known as a data protection means using a plurality of disk devices.

Figure 7:
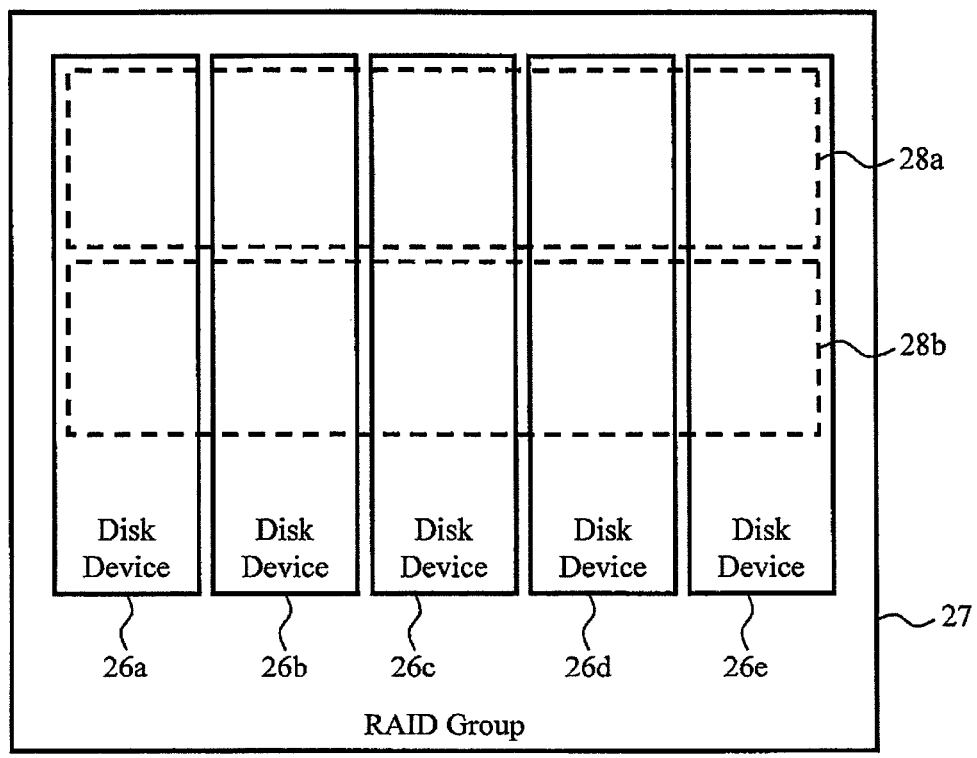
FIG. 7 is a diagram showing the relationship between a RAID group and logical volumes of the storage device 2 of the present invention.

FIG. 7 is a diagram showing the configuration of a RAID group 27 and the logical volume 28 in the storage device 2.

The RAID group 27 includes a plurality of disk devices 26 (26a to 26e). A combination of the plurality of disk devices 26 constitutes a single storage capacity. It is assumed herein that the RAID group 27 is built with the RAID level 5 redundancy method.

The logical volumes 28 (28a and 28b) divide the storage capacity of the RAID group 27 and constitute a single storage capacity. Herein, as the logical volumes 28a and 28b are included in the single RAID group 27, the throughput of the logical volumes 28a and 28b corresponds to the throughput of the RAID group 27.

<Configuration of Database>

FIG. 8 is a diagram showing an exemplary configuration of the database 29 stored in the logical volume 28 in accordance with this embodiment of the present invention. In this embodiment, a database for storing observed data (e.g., temperature data) of various devices (e.g., computers or storage in a data center) that are operated in a given computer center is used, for example. Although the database is analyzed from various aspects to predict a device failure or to select a newly introduced device, the present invention is not limited thereto.

The database 29 has stored therein a single table including four columns, for example. In the first column 2901 of the database 29, the date and time of observation are stored. In the second column 2902, an identifier of the observed device is stored. In the third column 2903, an identifier of a sensor (e.g., a temperature sensor or a vibration sensor) installed on the device is stored. In the fourth column 2904, a value read from the sensor is stored.

<Types of Data Entry Methods>

Hereinafter, a method for entering data into the distributed processing platform as used in this embodiment will be described. In this embodiment, the three following data entry methods are provided, for example, and a method with the highest processing speed is selected from among such methods. However, it is also possible to select two of the three methods or to add another method and select an entry method with the highest processing speed from among the four methods.

(i) Method for entering data into the distributed file system with the data entry server 1

(ii) Method for entering data using record identifiers (iii) Method for entering data by directly reading the database 29 with each node 3

Hereinafter, each method will be described in detail.

<Entry Method with the Data Entry Server>

Figure 9:
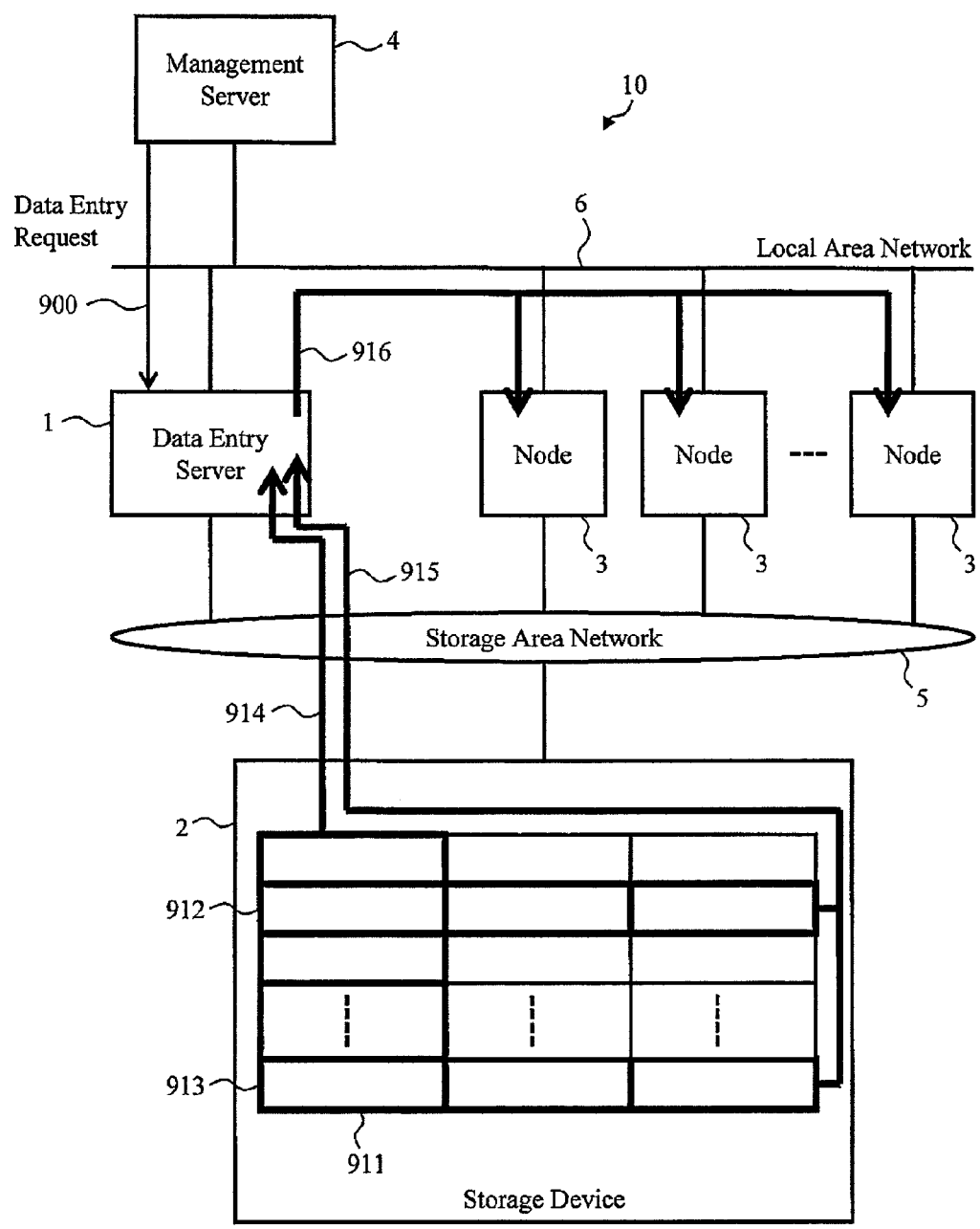
FIG. 9 is a diagram illustrating a data entry method with the data entry server 1.

FIG. 9 is a diagram illustrating a method for entering data into the distributed file system with the data entry server 1 in accordance with this embodiment of the present invention. In this method, the data entry server 1 searches the database 29 for data requested to be entered and obtains the data, and then enters such data into the distributed file system. A column of the database 29 to be searched is determined by analyzing a data entry request 900. Described hereinafter is a case in which a column 911 is determined to be the column to be searched.

First, the data entry server 1 obtains all records in the column 911 of the database 29 (a data flow 914), and selects records that meet the conditions specified by the data entry request 900 (e.g., conditions such as "observed data of a given PC obtained during a given period of time"). In the example herein, records 912 and 913 are selected through a search.

Next, the data entry server 1 obtains the records 912 and 913 (a data flow 915).

Finally, the data entry server 1 forms data to be entered into the distributed file system based on the obtained records 912 and 913, and stores the data into each node 3 (a data flow 916).

Although the example herein shows a case in which two records are extracted for descriptive purposes, more than two records can be extracted.

In the data flow 914, the data entry server 1 obtains all records in the column 911 from the logical volume 28 in which the database 29 is stored. In the data flow 915, the data entry server 1 obtains the records 912 and 913 from the logical volume 28. Thus, accessing the logical volume 28 to obtain such data takes a long time.

The data flows 914 and 915 can also be executed in parallel. In that case, however, the volume of data read from the logical volume 28 remains the same.

<Method Using Record Identifiers>

Figure 10:
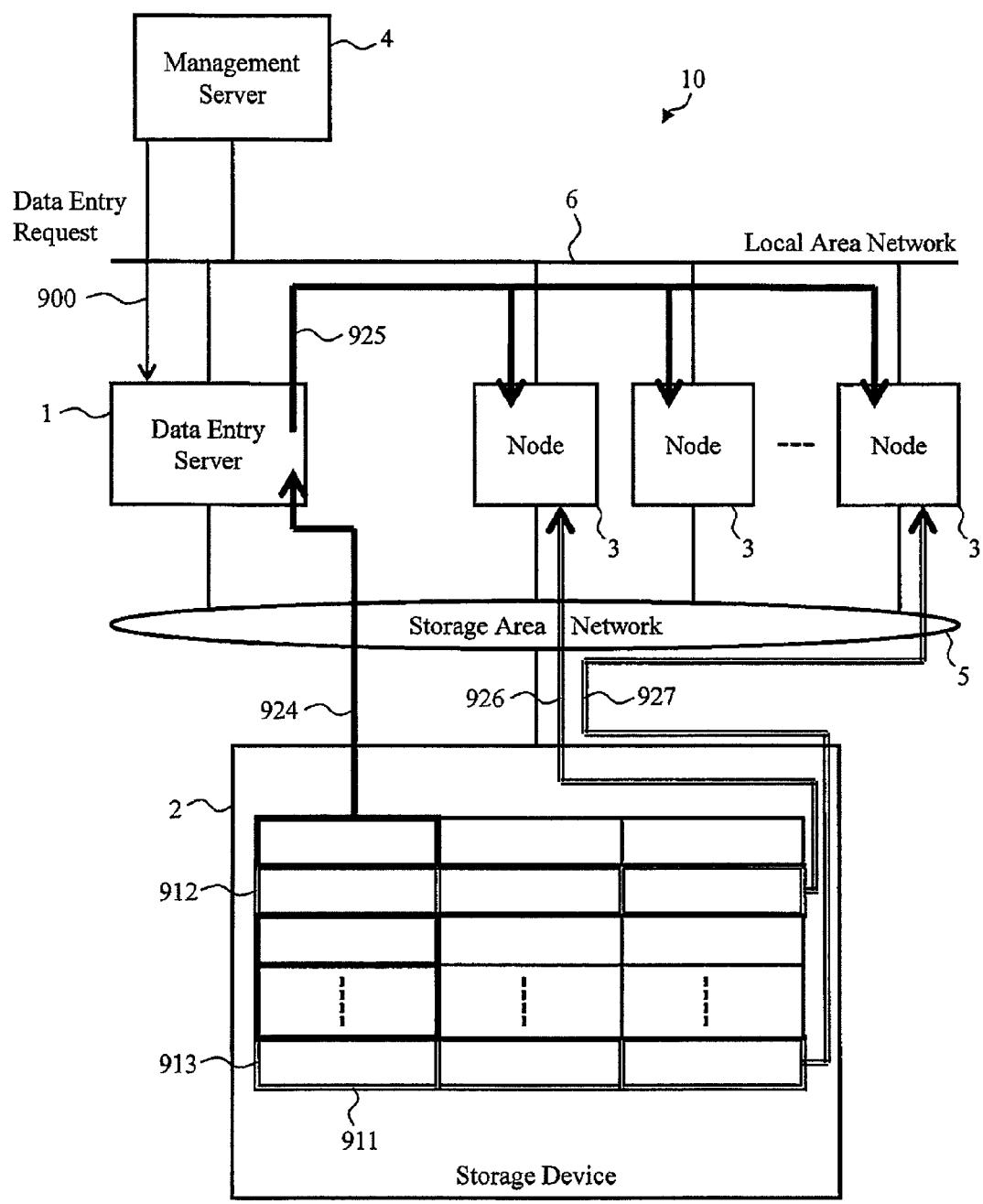
FIG. 10 is a diagram illustrating a data entry method using record identifiers.

FIG. 10 is a diagram illustrating a data entry method using record identifiers in accordance with this embodiment of the present invention. In this method, the data entry server 1, in response to the data entry request 900, searches the database 29 and extracts records that meet the conditions, and then obtains identifiers of the records. However, the data entry server 1 does not obtain the records. Then, the data entry server 1 sends the record identifiers with no overlaps to the nodes 3, so that the nodes 3 obtain the records based on the record identifiers. The record identifier herein is the identification information that is uniquely set for each record stored in the database 29. When the database 29 is searched for record identifiers as a search condition, desired records can be obtained at a fast speed. Described hereinafter is a case in which the column 911 is searched as in the aforementioned description.

First, the data entry server 1 obtains all records in the column 911 of the database 29 (a data flow 924), and selects records that meet the conditions. In the example herein, the records 912 and 913 are selected.

Next, the data entry server 1 obtains record identifiers of the selected records. The record identifiers can be stored in a data area of the database 29 or in other management areas. In such a case, the data entry server 1 also obtains the record identifiers in the data flow 924.

Further, the data entry server 1 evenly sends the obtained record identifiers to the nodes 3 with no overlaps (a data flow 925). The nodes 3, upon receiving the record identifiers, obtain records indicated by the record identifiers (data flows 926 and 927), and translate the records into a data form to be processed, and then start the processing.

The method in which the data entry server 1 enters data (FIG. 9) takes a long processing time as the data to be processed is sent via the LAN 6 and the SAN 5, whereas in the method using record identifiers (FIG. 10), the processing speed can be expected to be increased as the data to be processed is not sent via the LAN 6. However, the method using record identifiers would take an additional processing time for sending the record identifiers in the data flow 925.

<Direct Read Method Using the Nodes>

Figure 11:
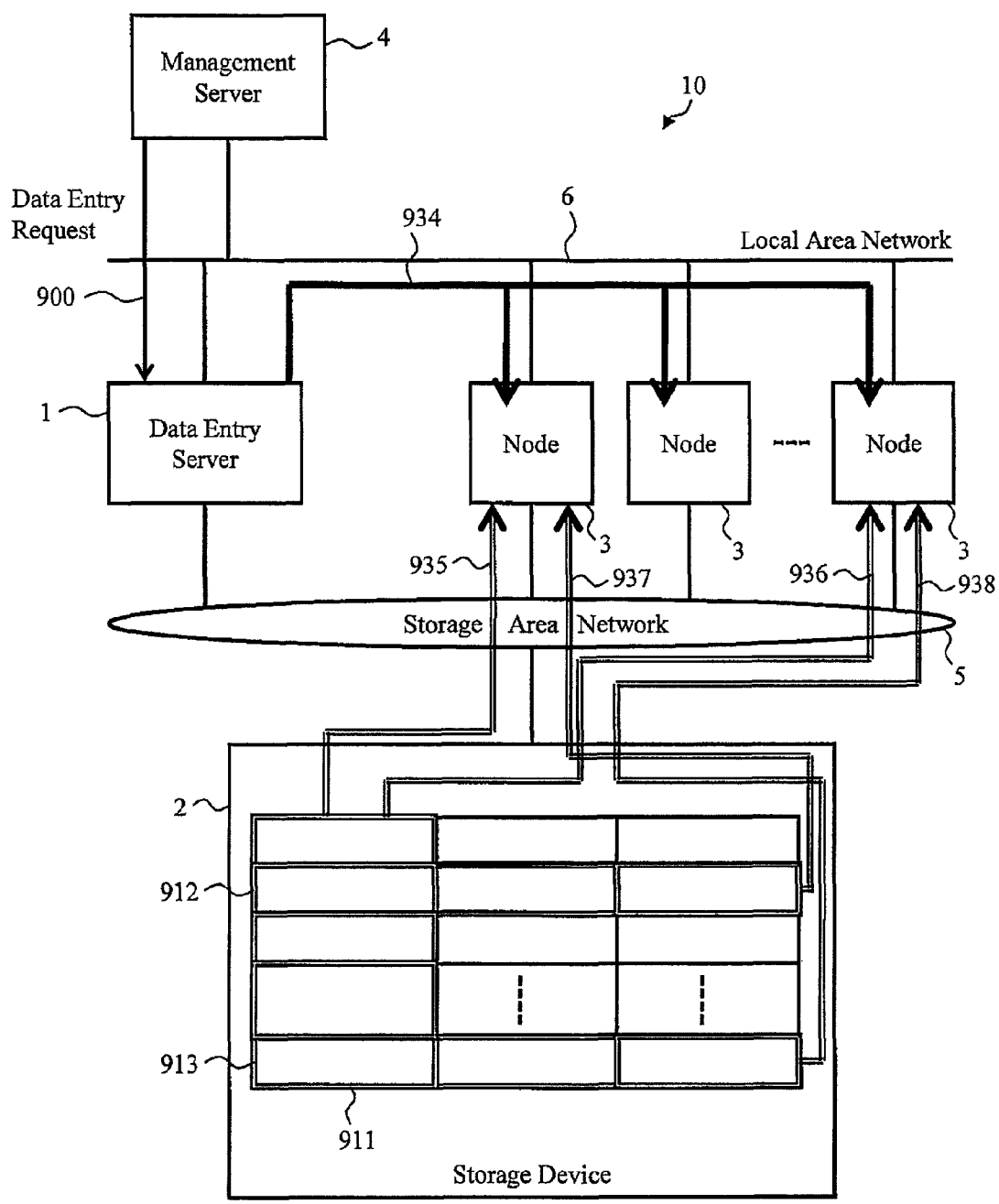
FIG. 11 is a diagram illustrating a data entry method in which the nodes 3 directly access a logical volume 28.

FIG. 11 is a diagram illustrating a data entry method in which the nodes 3 directly read the database in accordance with this embodiment of the present invention. In this method, the data entry server 1 creates from the data entry request 900 search conditions for the nodes 3 to read records with no overlaps (search conditions based on which the nodes 3 should execute a search), and sends the search conditions to the nodes 3. The nodes 3, upon receiving the search conditions, individually search the database 29 based on the search conditions, and obtain records to be processed.

The data entry server 1, upon receiving the data entry request 900, creates search conditions to be sent to the nodes 3 based on the data entry request 900 so that the nodes 3 will be able to read records with no overlaps. Herein, the range of data stored in the column 911 is assigned to each node 3.

The data entry server 1 sends the created search conditions to each node 3 (a data flow 934).

Then, each node 3 searches the database 29 based on the received search conditions.

To execute a search, each node obtain all records in the column 911 (data flows 935 and 936). Through such a search, each node identifies a record that meets the conditions and reads such record (data flows 937 and 938). According to such a method, the column 911 is read by each node 3 with overlaps.

<Entry Method Determination Processing>

Figure 12:
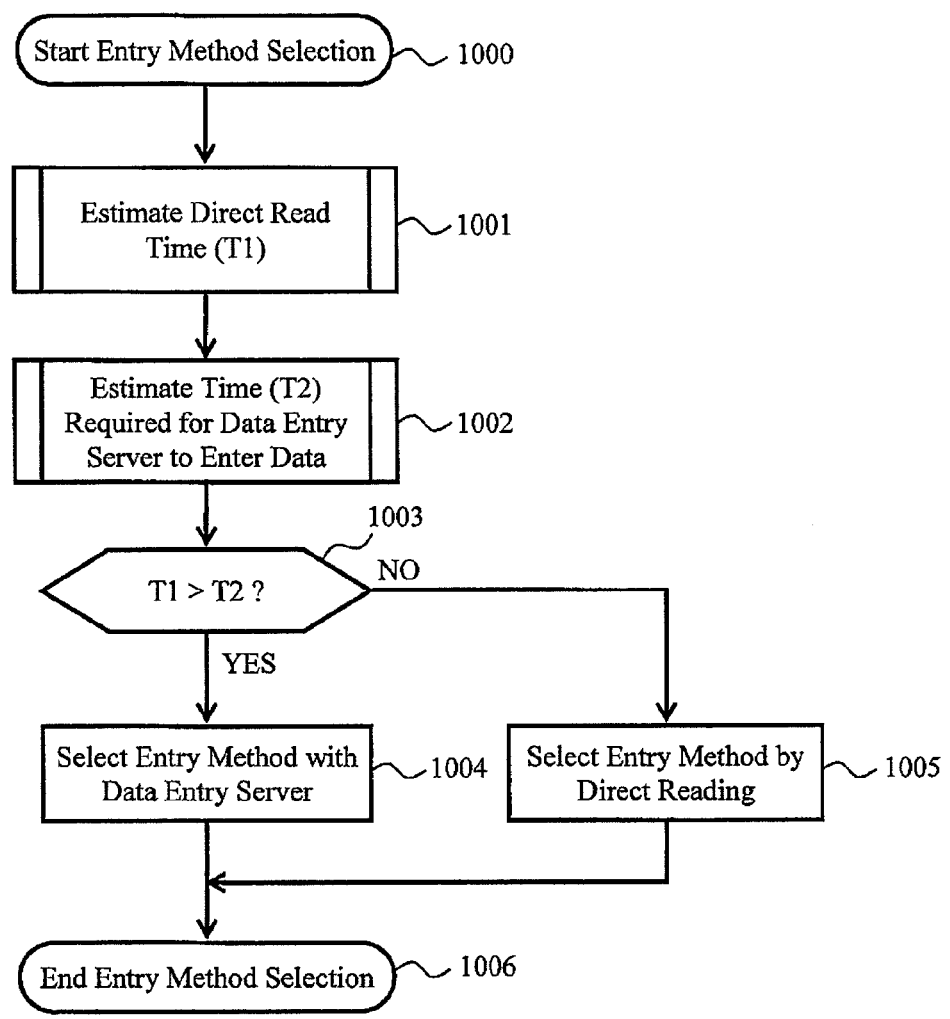
FIG. 12 is a flow chart illustrating the processing of determining a data entry method in accordance with the present invention.

FIG. 12 is a flow chart illustrating an overview of the processing of determining a data entry method in accordance with this embodiment of the present invention. The entry method determination processing is executed when the processor 13 of the data entry server 1 causes the estimate computation execution program 103 to operate upon receiving a data entry request from the management server 4 via the data entry instruction processing program 102. The processor 13 operates the data entry instruction processing program 102 and transfers the received data entry request to the estimate computation execution program 103. The entry method determination processing starts with step 1000 in accordance with the estimate computation execution program 103.

In step 1001, the processor 13 estimates the time T1 required for each node to directly read the database as a data entry method, and retains the result in the memory 11. This processing will be described in detail later.

In step 1002, the processor 13 estimates the time T2 required for the data entry server 1 to enter data into the distributed processing platform as another data entry method, and retains the result in the memory 11. This processing will be described in detail later.

In step 1003, the processor 13 compares the estimated times T1 and T2. If the T1 is determined to be shorter than the T2 (if the answer to step 1003 is No), the flow proceeds to step 1005, so that the entry method in which each node 3 directly reads the database is selected. If the T1 is determined to be longer than the T2 (if the answer to step 1003 is Yes), the flow proceeds to step 1004, so that the data entry method with the data entry server 1 is selected. Upon termination of the aforementioned processing, the processor 13 terminates the entry method determination processing (step 1006).

Using the entry method determined through the aforementioned entry method determination processing, the processor 13 enters the data to be processed into the distributed processing platform (the target nodes 3).

<Details of the Processing (step 1001) of Estimating the Direct Entry Time (T1)>

Figure 13:
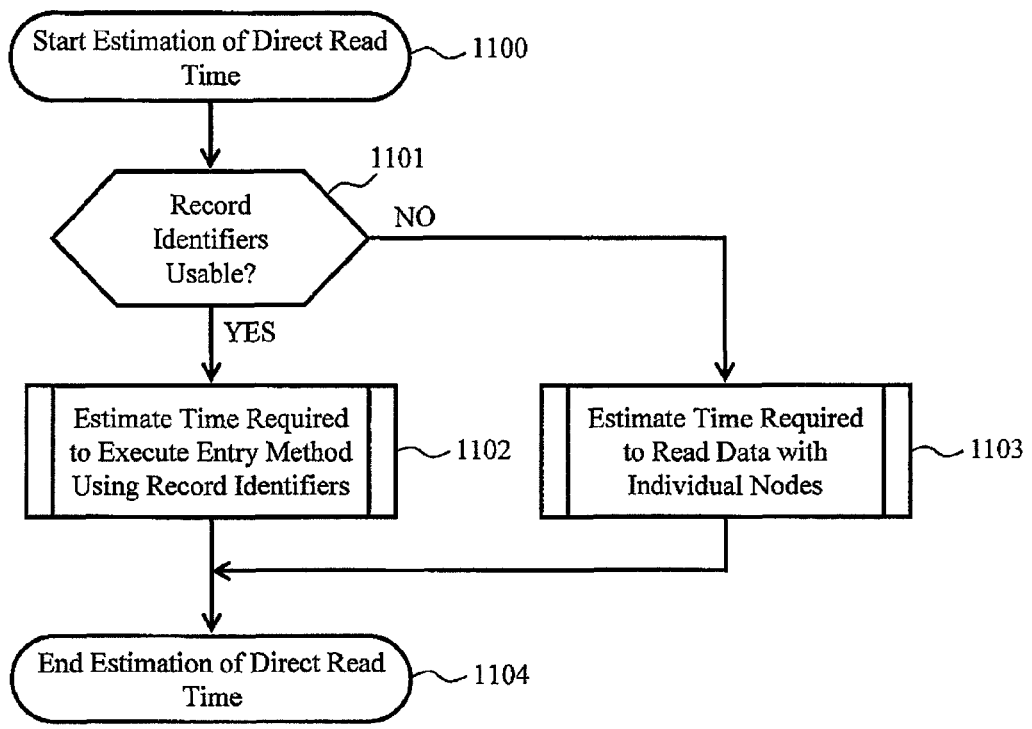
FIG. 13 is a flow chart illustrating the processing of calculating the data entry processing time when the nodes 3 directly access the logical volume 28 in accordance with the present invention.

FIG. 13 is a flow chart illustrating the details of the processing (step 1001) of estimating the time required to execute the direct entry processing in accordance with this embodiment of the present invention.

The present processing starts with step 1100. In step 1101, the processor 13 determines if the DBM program 301 of the node 3 is able to obtain data stored in the database 29 using record identifiers. This is determined by referring to the DBM program 101 (the DBM program 101 has the same content as the DBM program 301) with the processor 13 or checking if DBM configuration information (not shown) has registered thereon information indicating whether or not data acquisition using record identifiers is supported.

If record identifiers are determined to be usable (if the answer to step 1101 is Yes), the flow proceeds to step 1102, so that the processor 13 estimates the time required to execute the data entry method using record identifiers (step 1102). Step 1102 will be described in detail with reference to FIG. 14.

If record identifiers are determined to be not usable (if the answer to step 1101 is No), the flow proceeds to step 1103, so that the processor 13 estimates the time required for each node 3 to individually read data from the database 29 (step 1103). Step 1103 will be described in detail with reference to FIG. 15.

Upon calculating any of the aforementioned estimated times, the processor 13 terminates the processing of estimating the T1 (step 1104).

<Processing of Estimating the Time when Record Identifiers are used (Step 1102)>

Figure 14:
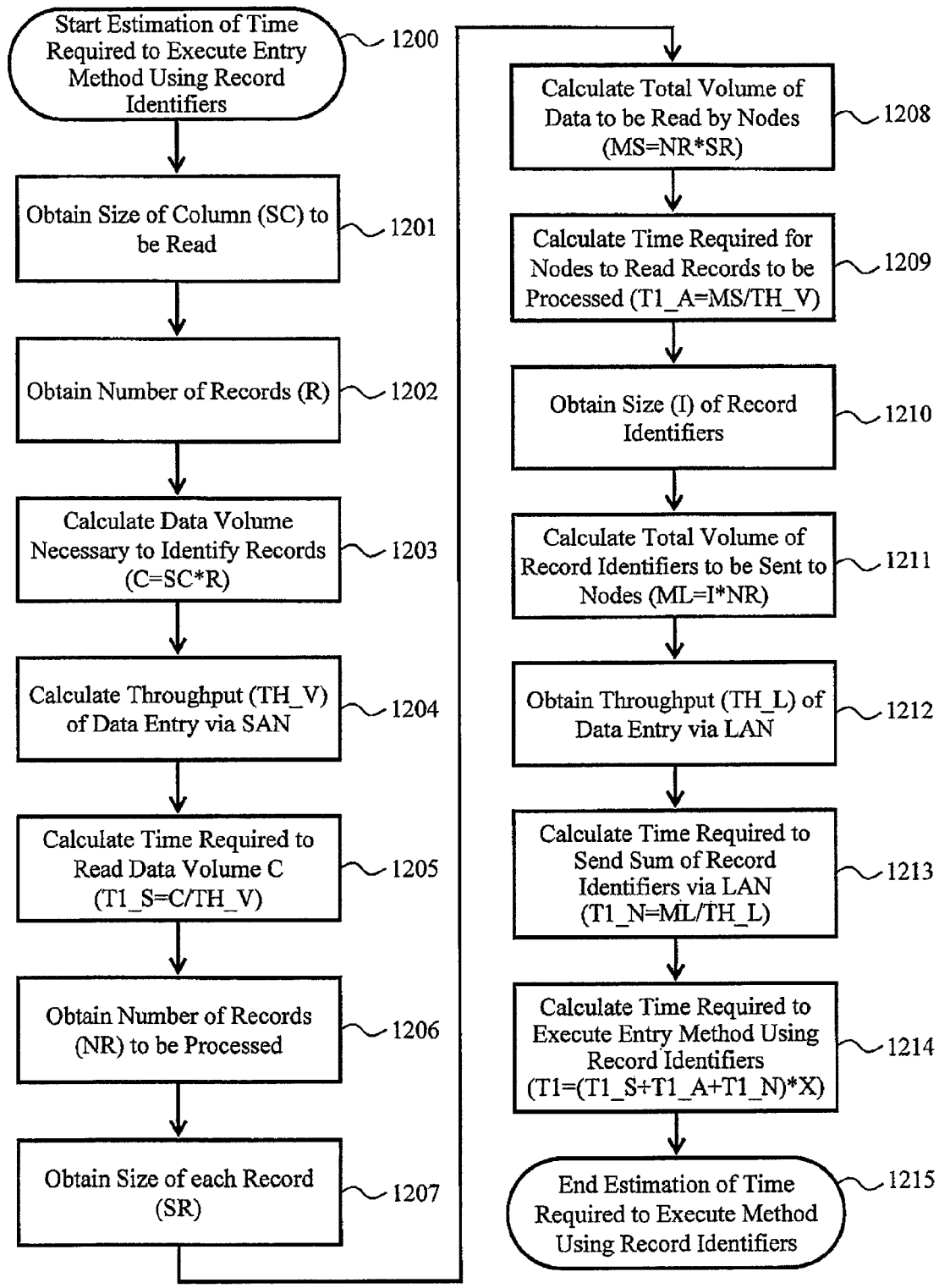
FIG. 14 is a flow chart illustrating the processing of calculating the data entry processing time when record identifiers are used in accordance with the present invention.

FIG. 14 is a flow chart illustrating the details of the processing (step 1102) of estimating the time required to execute the data entry method using record identifiers in accordance with this embodiment of the present invention.

The present processing starts with step 1200. In the present processing, the time required to search for records is calculated first from the volume of data to be read from the logical volume 28 and the throughput of the logical volume 28.

In step 1201, the processor 13, in order to identify records to be entered into the distributed processing platform (any of the nodes 3), calculates the size SC (bytes) of a column including the records to be read. Such SC is obtained by first identifying a column that should be searched based on the data entry request 900, and then identifying the size of the column with reference to the DB configuration information 111.

In step 1202, the processor 13 identifies the number (R) of records stored in the database 29 with reference to the DB configuration information 111.

In step 1203, the processor 13 calculates the volume of data (C: which corresponds to the data volume of the column 911) that needs to be read from the logical volume 28 to execute a search to identify records to be entered into the distributed processing platform.

In step 1204, the processor 13 identifies the throughput (TH_V) of reading data from the logical volume 28 with reference to the volume throughput information 109.

In step 1205, the processor 13 calculates the time (T1_S) required to read the data volume C calculated in step 1203 from the logical volume 28 based on the C and TH_V.

In steps 1206 to 1208, the processor 13 calculates the time required for each node 3 to individually read the record to be processed based on the volume of data to be read from the logical volume 28 and the throughput of the logical volume 28.

Next, the processor 13 calculates the total processing time required for each node 3 to individually read the record to be processed. Such time is calculated from the total volume of data to be read from the logical volume 28 and the throughput of the logical volume 28.

In step 1206, the processor 13 calculates the approximate number of records (NR) to be read. This value is determined from the data distribution state of each column identified in step 1201 and the extraction conditions of the data to be processed that are included in the data entry request 900 sent from the management server 4. The data distribution state of each column is obtained from the configuration information of the database 29 stored as the DB configuration information 111. For example, if the data to be processed is data on all devices for a given month, the processor 13 calculates the number of records accumulated in one month by extracting the number of sensors and the values of the sensors stored in the database 29 with reference to the DB configuration information 111 and obtaining intervals of data stored in the database 29.

In step 1207, the processor 13 obtains the size SR (bytes) of each record with reference to the DB configuration information 111.

In step 1208, the processor 13 calculates the total volume (MS) of data to be read by the nodes 3. This value is the product of the aforementioned NR and SR.

In step 1209, the processor 13 calculates the time (T1_A) required for each node 3 to read the record to be processed. This value is determined from the aforementioned MS and TH_V.

Next, the processor 13 calculates the time required to send record identifiers to the nodes. In step 1210, the processor 13 obtains the size I (bytes) of the record identifiers via the DBM program 101.

In step 1211, the processor 13 calculates the estimated total volume (ML) of the record identifiers to be sent to the nodes. This value is the product of the aforementioned NR and I.

In step 1212, the processor 13 obtains the throughput (TH_L) of entering data via the LAN 6 from the LAN throughput information 108.

In step 1213, the processor 13 determines the time (T1_N) required to send the record identifiers via the LAN 6 by dividing the total volume ML of the record identifiers determined in step 1211 by the TH_L.

In step S1214, the processor 13 determines the time T1 required to execute the method using record identifiers, as the sum of the aforementioned T1_S, T1_A, and T1_N. Herein, it is also possible to further multiply the T1 by an adequate coefficient (X) on the assumption that part of T1_S, T1_A, and T1_N can be processed in parallel. That is, if parallel processing can be executed, the processing time required therefor can be shorter than the total time of the T1_S, T1_A, and T1_N. Thus, multiplying them by 0.8 or 0.7, for example, can calculate the T1 for which the parallel processing is taken into account.

Through the aforementioned processing, the processor 13 terminates the calculation of the T1 (step 1215).

<Details of the Processing (Step 1103) of Estimating the Direct Read Time (T1)>

Figure 15:
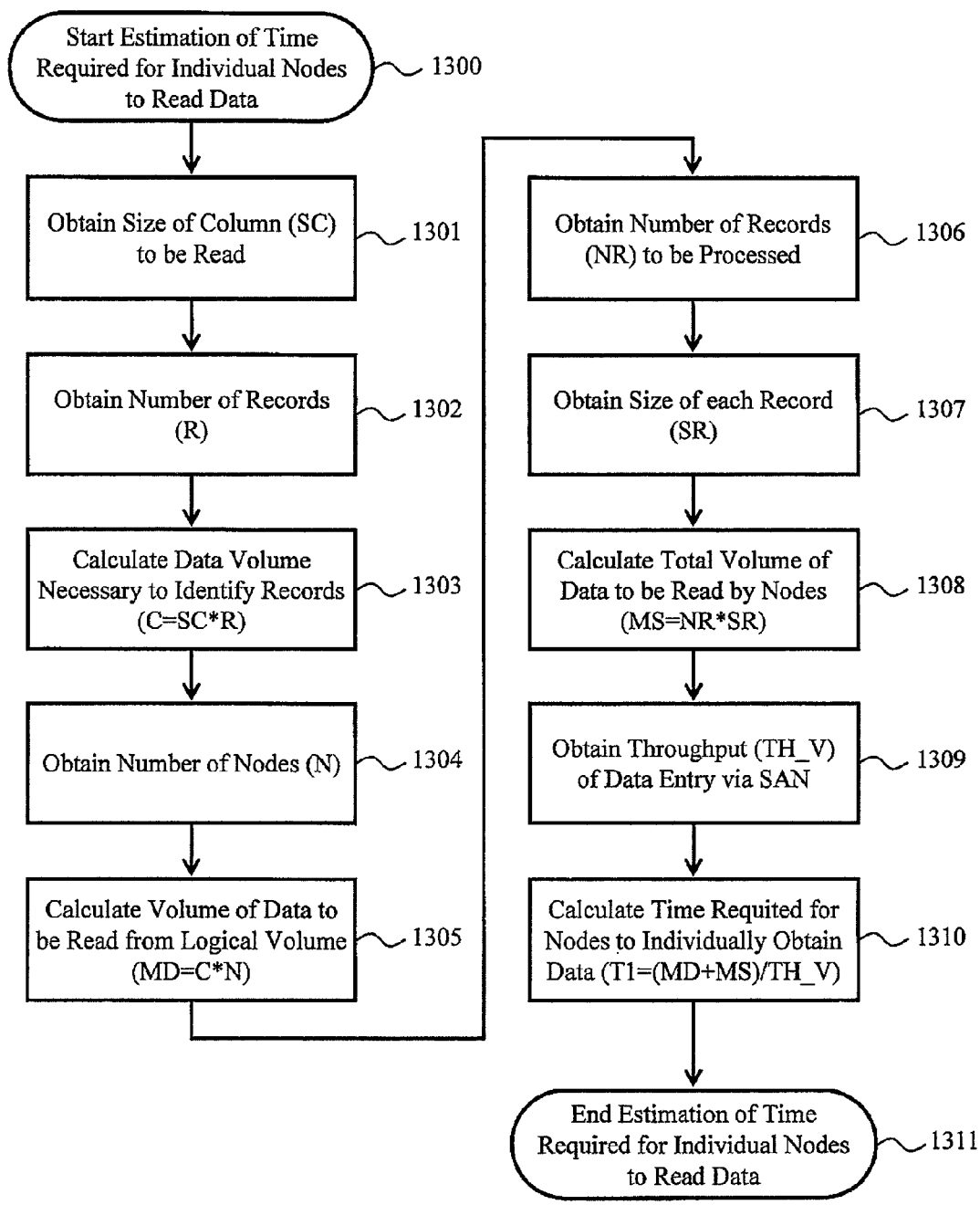
FIG. 15 is a flow chart illustrating the processing of calculating the data entry processing time when record identifiers are not used and the nodes 3 directly access the logical volume 28 in accordance with the present invention.

FIG. 15 is a flow chart illustrating the details of the processing (step 1103) of estimating the time (T1) required for each node 3 to individually access the database 29 and obtain the data to be processed.

The present processing starts with step 1300. In step 1301 to step 1303, the volume of data (C), which needs to be read from the logical volume 28 to search for records, is calculated. This processing is the same as those in step 1201 to step 1203. In step 1304, the processor 13 obtains the number (N) of the nodes 3.

Then, in step 1305, the processor 13 calculates the volume of data (MD) to be read from the logical volume 28 when each node 3 individually executes a search. This can be determined from the product of the C and N on the assumption that each node refers to the same records.

In step 1306 to step 1308, the processor 13 calculates the total volume (MS) of the records to be read from the database 29 by the nodes 3. This processing is the same as those in step 1206 to step 1208.

In step 1309, the processor 13 obtains the throughput (TH_V) of reading data from the logical volume 28. This processing is the same as that in step 1204.

In step 1310, the processor 13 estimates the time (T1) required for each node 3 to individually obtain data from the database 39. This value can be determined by substituting the aforementioned MD, MS, and TH_V into T1=(MD+MS)/TH_V.

Returning the T1 determined as described above, the processor 13 terminates the processing (step S1311).

<Details of the Processing (Step 1002) of Estimating the Server Entry Time (T2)>

Figure 16:
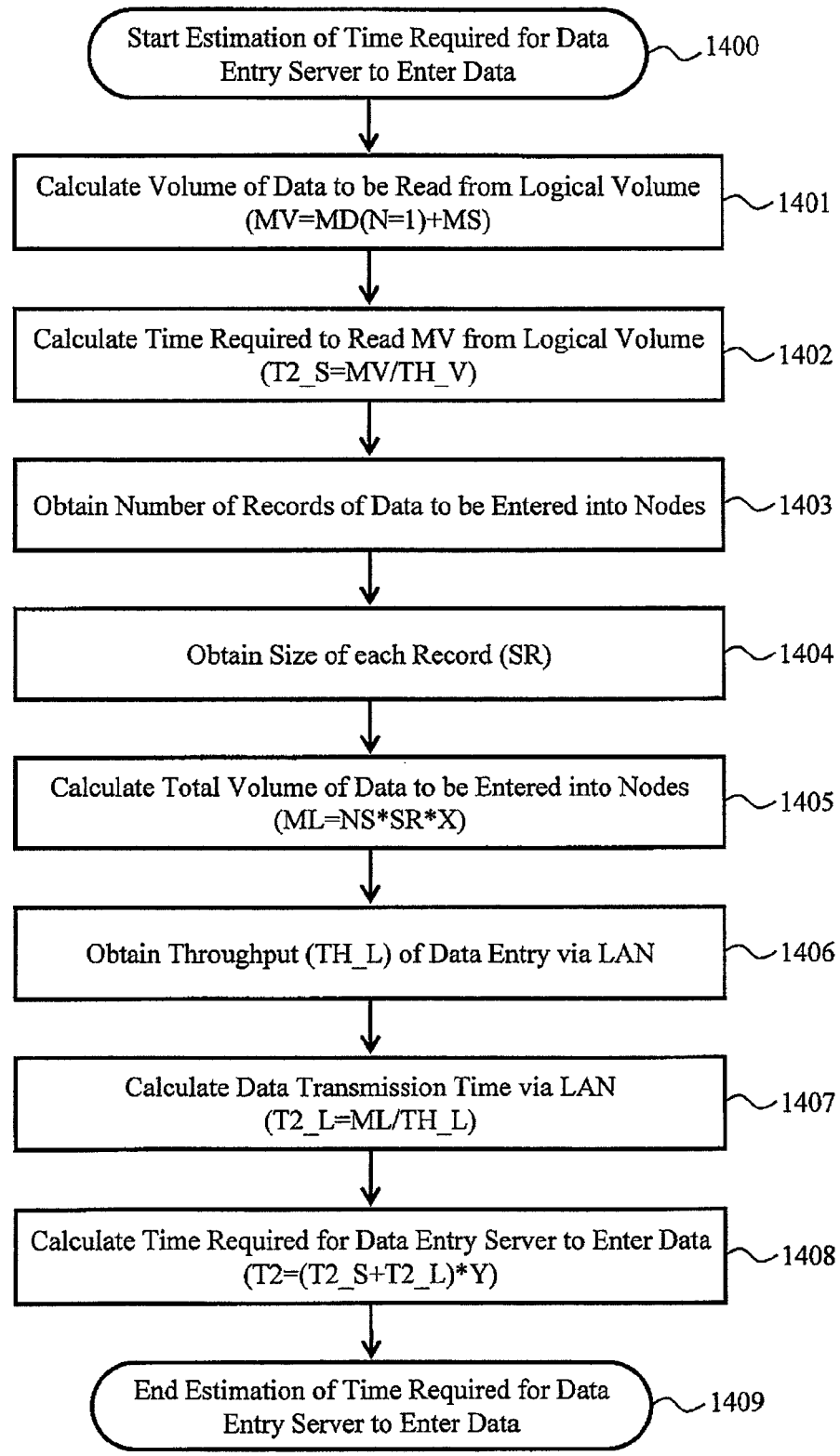
FIG. 16 is a flow chart illustrating the processing of calculating the data entry processing time of the data entry server 1 in accordance with the present invention.

FIG. 16 is a flow chart illustrating the details of the processing (step 1002) of estimating the processing time (T2) required for the data entry server 1 to obtain data from the database 29 and enter the data to be processed into the distributed processing platform (each node).

The present processing starts with step 1400. In step 1401, the processor 13 calculates the volume of data (MV) to be read from the logical volume 28. This value is determined by summing the MD calculated in step 1305 and the MS calculated in step 1308 (MV=MD+MS).

In step 1402, the processor 13 calculates the time (T2_S) required to read the MV. This value is determined by dividing the aforementioned MV by the TH_V (T2_S=MV/TH_V).

In step 1403, the processor 13 estimates the number of records (NS) of data to be entered into the distributed processing platform. This processing is the same as those in step 1206 and 1306.

In step 1404, the processor 13 obtains the size of each record (SR). This processing is the same as those in step 1207 and step 1307.

In step 1405, the processor 13 obtains the total volume (ML) of data to be entered into the distributed processing platform. This value is determined by multiplying the aforementioned NS and SR. It should be noted that when data is entered into the distributed processing platform, if data translation is necessary, the aforementioned value can be further multiplied by the increase-decrease rate (X) of the data volume for the translation.

In step 1406, the processor 13 obtains the throughput (TH_L) of entering data into the distributed processing platform via the LAN 6. This processing is the same as that in step 1212.

In step 1407, the processor 13 calculates the approximate time (T2_L) required to enter the data into the distributed processing platform via the LAN 6. The T2_L is determined by dividing the ML by the TH_L (T2_L=ML/TH_L).

In step 1408, the processor 13 calculates the approximate time (T2) required for the data entry server 1 to enter the data into the distributed processing platform. The T2 is determined as T2_S+T2_L.

It should be noted that if the data reading from the logical volume 28 and the data transmission via the LAN 6 can be performed in parallel, the aforementioned value can be further multiplied by a coefficient (Y) for which such parallel processing is taken into account.

Then, the processor 13 returns the obtained T2 and terminates the processing (step 1409).

<Variation: When Index is Set>

There are cases in which dereference information for increasing the search speed is set in the column to be searched. Dereference information has a data structure having the value of the relevant column as a key and having recorded thereon the internal identification information or storage position of records. The deference information are stored in order of the values of columns. Therefore, it is possible to eliminate the need to read all columns having records in order to extract a record that meets the search conditions. Therefore, the processing speed can be further increased.

Thus, if dereference information is set in the target column, in calculation of the volume of data to be read from the logical volume 28 to execute a search (steps 1201 to 1203, steps 1301 to 1303, and step 1401), the number of columns to be read can be determined by multiplying the number of records (NR) to be read by an adequate coefficient. Such coefficient can differ depending on the structure of the deference information used in the database 29.

<Screen of Management Server>

FIG. 17 is a diagram showing a management screen 40 of the management server (management computer) 4 in accordance with this embodiment of the present invention. The management screen 40 is displayed on a display device such as a monitor connected to the management sever 4, a monitor of another computer, or the like. The user can operate the management screen 40 using an input device such as a keyboard or a mouse, and instructs the data entry server 1 to enter data into the distributed processing platform.

On the management screen 40, for example, a table 400, a data extraction condition entry area 410, a direct entry validation button 421, an estimate button 422, and a start button 423 are displayed. The direct entry validation button 421 herein is a button to permit all nodes 3 to directly access data in the database 29.

On the table 400, the total volume of data to be sent to the distributed processing platform from the data entry server 1 via the LAN 6 (row 403), the total volume of data to be read from the logical volume 28 by the data entry server 1 or the nodes 3 (row 404), and a data entry processing time (row 405) are displayed in relation to the data entry with the data entry server 1 (column 401) and the direct data entry with the nodes 3 (column 402). In the row 406, a button to select a data entry method is displayed.

The operation of the user using such a screen will now be described. First, the user enters into the data extraction condition entry area 410 the conditions of data to be entered into the distributed processing platform. The example herein shows a case in which data in the period of February, 2010 is entered.

Thereafter, when the user has pressed the estimate button 422, the data entry server 1 performs the processing shown in FIGS. 12 to 16 to calculate the volume of data to be sent via the LAN 6, the volume of data to be sent via the SAN 5, the time required to enter the data, and an optimal data entry method. Such values are displayed on the table 400 by the management server 4. In the example herein, the direct entry method with the nodes 3 is selected as the data entry method.

If the user agrees with such selection, he/she presses the start button 423 to instruct the data entry start. The user can also change the data entry method by operating the button displayed in the row 406. At this time, the user can activate the button 421 so that an access control of the nodes 3 to the logical volume 28 can be automatically set. If data entry start is instructed with the button 421 in an active state, the storage device 2 and the SAN 6 are set such that each node 3 is able to access the logical volume 28. Such processing can also be performed by the data entry server 1 or the management server 4.

Embodiment 2

(2) Second Embodiment

Figure 18:
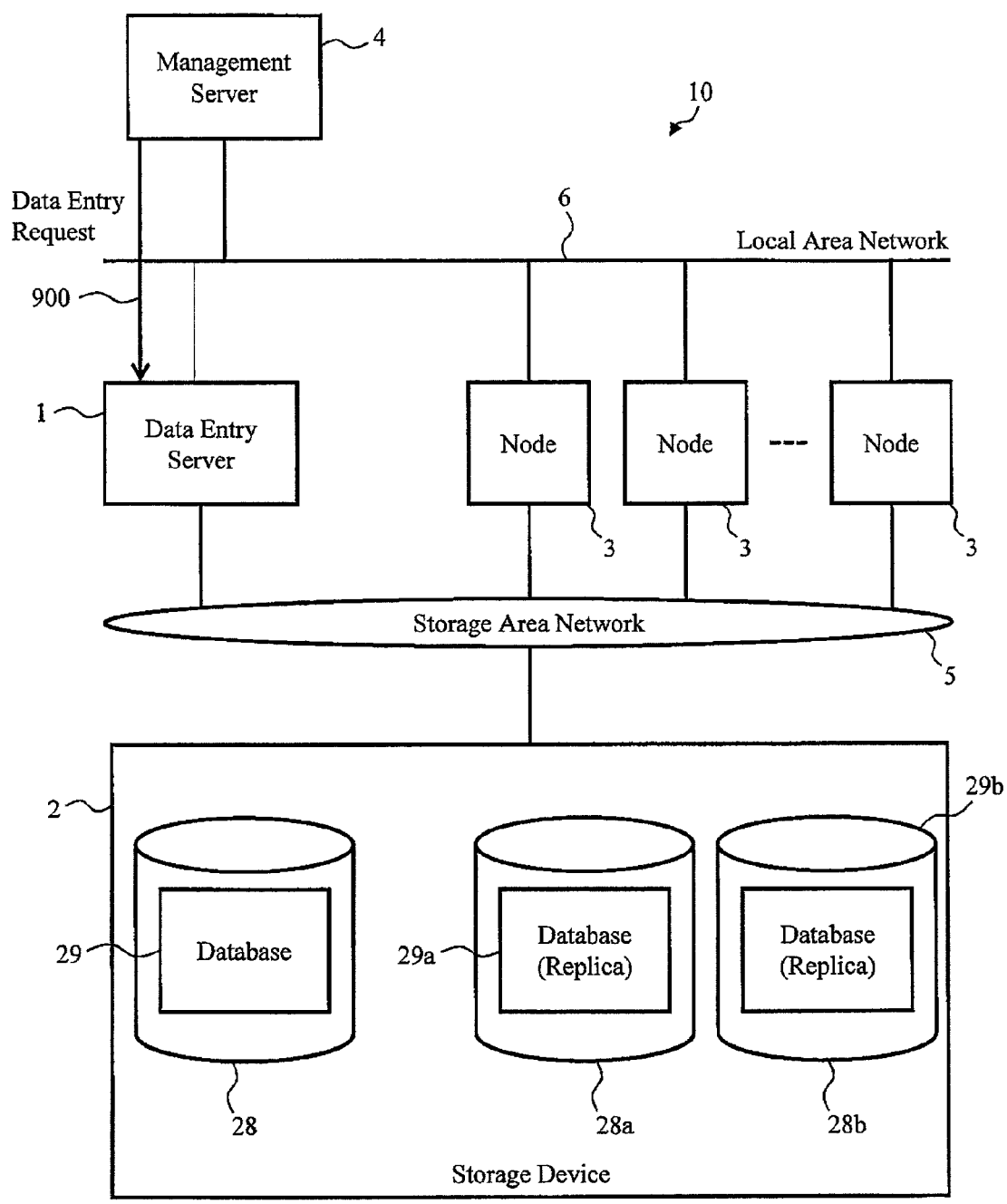
FIG. 18 is a diagram showing the schematic configuration of the computer system 10 in accordance with the second embodiment of the present invention.

FIG. 18 is a diagram showing the schematic configuration of the computer system 10 in accordance with the second embodiment of the present invention.

In the second embodiment, the storage device 2 has a function of internally replicating a logical volume, whereby the speed of reading the logical volume 28 with the data entry server 1 and each node 3 is increased using the replication of the logical volume. In this embodiment, in addition to the three data entry methods described in the first embodiment, another data entry method is provided in which replicas 28*a* and 28*b* of the logical volume 28 having stored therein the database 29 are created prior to the execution of the data entry so that each node 3 will read data from the replicas in parallel. Although FIG. 18 shows an example in which two replicas of the logical volume are used, the number of replicas can be more than two.

In this embodiment, in addition to the two data entry processing times estimated in the first embodiment, the following data entry processing times are also estimated.

T1*m*: The time required for the nodes 3 to directly enter data when replicas of the logical volume are used.

T2*m*: The time required for the data entry server 1 to enter data when replicas of the logical volume are used.

<Calculation of the Estimated Time and Entry Method Selection Processing>

T2*m* is calculated as follows.

(i) The time (TR) required to replicate the logical volume 28 is calculated first. This value can be calculated from the volume of the logical volume 28 and the volume replication throughput of the storage device 2. The volume replication throughput can be an actual measured value. If the logical volume 28 in the replication destination already includes part of the replica of the logical volume 28 (the database 29) in the replication source, the time required to replicate the difference is calculated.

(ii) In step 1402 in which the time required for the data entry server 1 to enter data is estimated as described with reference to FIG. 16, the T2 is calculated by replacing the throughput (TH_V) of the logical volume 28 by the total throughput (TH_V') of the logical volumes 28 in the replication destination. This T2 is represented as T2'.

(iii) The aforementioned TR and T2 are summed so that T2*m*=TR+T2'.

TH_V' represents the total throughput of the RAID group that constitutes the logical volumes 28 in the replication destination. If the logical volumes 28 belong to different RAID groups, the TH_V' corresponds to the total throughput of the logical volumes 28 in the replication destinations. It should be noted that if the throughput of the communication channel 25 between the storage device 2 and the SAN 5 or the throughput of the SAN 5 is lower than the aforementioned TH_V', the TH_V' is the throughput of the communication channel 25 or the SAN 5.

T1*m* is calculated from T1*m*=TR+T1' where T1' represents the T1 that has been calculated by replacing the TH_V in step 1204 of FIG. 14 and in step 1309 of FIG. 15 by the TH_V'.

The thus calculated T1*m* and T2*m*, and T1 and T2 calculated in the first embodiment are compared to select a method with the shortest estimated processing rime as an entry method.

When direct reading by each node 3 is executed as a result of the aforementioned determination, the data entry server 1 instructs each node 3 to access a given logical volume 28 so that the number of the nodes 3 that access each logical volume 28 can be made equal.

Embodiment 3

(3) Third Embodiment

Figure 19:
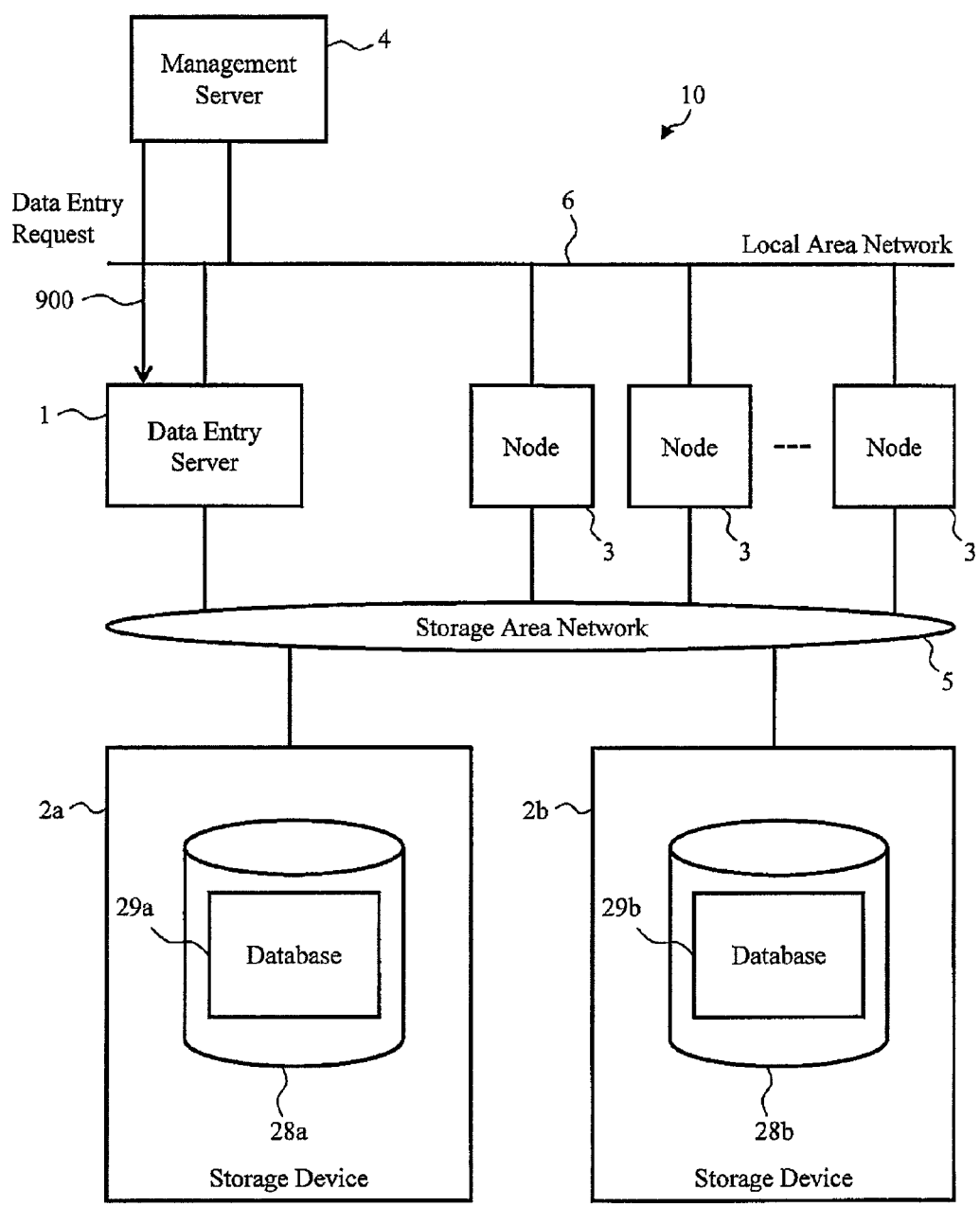
FIG. 19 is a diagram showing the schematic configuration of the computer system 10 in accordance with the third embodiment of the present invention.

FIG. 19 is a diagram showing the schematic configuration of the computer system in accordance with the third embodiment of the present invention.

In the third embodiment, a plurality of storage devices 2*a* and 2*b* is used. The storage devices 2*a* and 2*b* have logical volumes 28*a* and 28*b*, respectively. The database 29 is divided (databases 29*a* and 29*b*) for storage in the logical volumes 28*a* and 28*b*. Although FIG. 19 shows an example in which two storage devices are used, more than two storage devices can be used. In addition, the database 29 can be divided for storage in more than two logical volumes.

In this embodiment, each logical volume 28 can be accessed in parallel as in the second embodiment. Thus, the T2 is calculated based on the total throughput TH_V''' of the plurality of logical volumes as the throughput TH_V of the logical volume. It should be noted that when the throughput of the access path between the storage devices 2, each node 3, and the data entry server 1 including the SAN 5 is lower than the TH_V''', the TH_V''' is the throughput of such access path.

Then, a method with the shortest estimated processing time is selected using the T1 and T2 that have been calculated using the TH_V'''.

When each of the storage devices 2*a* and 2*b* has a function of replicating the logical volume 28, a processing time which is required when replicas are used can be calculated as in the second embodiment so that such a method can be used as a candidate entry method.

(4) Conclusion

The present invention can be used as, when a large volume of data is to be processed (e.g., analyzed) using a plurality of computer resources, in particular, an efficient method for entering the data to be processed into the computer resources.

In one embodiment of the present invention, the data entry server (1) estimates the processing time required to execute each of the first and second data entry methods, and selects one of the first and second data entry methods based on the estimated processing time. Then, the data entry server (1) or a plurality of nodes (3) executes data entry processing based on the selected data entry method. The first data entry method herein is a method in which the data entry server (1) reads data from the logical volume (28) in response to a data entry request from a user, and then divides the data into a plurality of blocks and sends the data blocks to the plurality of nodes (3) with no overlaps. More specifically, the data entry server (1) obtains all data in a given column of the database (29) included in the logical volume (28), identifies data to be read using the data in the column, obtains the identified data from the database (29), and distributes the obtained data to the plurality of nodes (3). Meanwhile, the second data entry method is a method in which the plurality of nodes (3), in response to an instruction from the data entry server (1), reads data from the logical volume (28) with no overlaps by dividing the data into a plurality of blocks. More specifically, examples of the second data entry method include a (i) method in which the data entry server (1) obtains all data in a given column of the database (29) included in the logical volume (28), identifies data to be read using the data in the column, and sends information on the identified data to the plurality of nodes (3), so that the plurality of nodes (3) obtains the identified data from the database (29), and (ii) a method in which the plurality of nodes (3) obtains all data in a given column of the database (29) included in the logical volume (28), identifies data to be read using the data in the column, and obtains the identified data from the database (29). By executing such data entry processing, data is entered into the distributed platform (each node) after a data entry path with the shortest processing time is selected from among various data entry paths. Thus, the data entry processing speed can be increased.

The processing time required to execute each of the first, second A, and second B data entry methods is estimated using the throughput of the SAN (5) and the LAN (6), the throughput of the logical volume (28), the total volume of data to be sent to the plurality of nodes (3), and the total volume of data to be read from the logical volume (28). Accordingly, the processing time of each method can be accurately estimated.

When the storage device (2) has replicas (28a and 28b) of the logical volume (28) or when the computer system (10) has a plurality of storage devices (2a, 2b), the time required to read data from the plurality of data storage areas in parallel is calculated, so that the processing time is estimated using the calculated time. Executing parallel processing allows a further increase in the data entry processing speed.

It should be noted that the present invention can also be realized by a program code of software that implements the functions of the embodiments. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the functions of the aforementioned embodiments, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, a CD-R, a magnetic tape, a non-volatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, the CPU or the like of the computer may, based on the instruction of the program code, perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as a CD-RW or the CD-R, and at the point of use, the computer (or the CPU or the MPU) in the system or the apparatus may read the program code stored in the storage means or the storage medium and execute the program code.

REFERENCE SIGNS LIST

1 Data Entry Server
2 Storage Device
3 Node
4 Management Server
5 SAN
6 LAN

The invention claimed is:

1. A data processing method of a computer system, the computer system including a data entry server, a plurality of nodes connected to the data entry server via a first network, and a storage device connected to the data entry server and the plurality of nodes via a second network, the storage device including a logical volume having stored therein at least data as data sources that can be read by each of the plurality of nodes, the method comprising:
   causing the data entry server to estimate a processing time required to execute each of first and second data entry methods, and to select one of the first and second data entry methods based on the estimated processing time; and
   causing the data entry server or the plurality of nodes to execute data entry processing based on the selected data entry method,
wherein the first data entry method is a method in which the data entry server reads data from the logical volume, divides the data into a plurality of blocks, and sends the data blocks to the plurality of nodes with no overlaps,
wherein the second data entry method is a method in which the plurality of nodes, in response to an instruction from the data entry server, reads the data from the logical volume with no overlaps by dividing the data into a plurality of blocks, and
wherein the storage device storing the logical volume is separated from the plurality of nodes so that the logical volume does not constitute a distributed file system which is composed of the plurality of nodes.

2. The data processing method according to claim 1,
wherein the first network is a local area network and the second network is a storage area network,
wherein the first data entry method is a method in which the data entry server obtains all data in a given column of a database included in the logical volume, identifies data to be read using the data in the column, obtains the identified data from the database, and distributes the obtained data to the plurality of nodes,
wherein the second data entry method includes:
(i) a second A method in which the data entry server obtains all data in a given column of the database included in the logical volume, identifies data to be read using the data in the column, and sends information on the identified data to the plurality of nodes, so that the plurality of nodes obtains the identified data from the database, and
(ii) a second B method in which the plurality of nodes obtains all data in a given column of the database included in the logical volume, identifies data to be read using the data in the column, and obtains the identified data from the database, and
wherein the data entry server estimates a processing time required to execute each of the first, second A, and second B data entry methods using throughput of the local area network, throughput of the storage area network, throughput of the logical volume, the total volume of data to be sent to the plurality of nodes, and the total volume of data to be read from the logical volume, and selects a data entry method with the shortest estimated processing time from among the first, second A, and second B data entry methods.

3. The data processing method according to claim 1,
wherein the first data entry method is a method in which the data entry server obtains all data in a given column of a database included in the logical volume, identifies data to be read using the data in the column, obtains the identified data from the database, and distributes the obtained data to the plurality of nodes,
wherein the second data entry method includes:
(i) a second A method in which the data entry server obtains all data in a given column of the database included in the logical volume, identifies data to be read using the data in the column, and sends information on the identified data to the plurality of nodes, so that the plurality of nodes obtains the identified data from the database, and
(ii) a second B method in which the plurality of nodes obtains all data in a given column of the database included in the logical volume, identifies data to be read using the data in the column, and obtains the identified data from the database, and

19 wherein the data entry server estimates a processing time required to execute each of the first, second A, and second B data entry methods, and selects one of the first, second A, and second B data entry methods based on the estimated processing time.

4. The data processing method according to claim 1, wherein the data entry server estimates the processing time required to execute each of the first and second data entry methods using throughput of the first and second networks, throughput of the logical volume, the total volume of data to be sent to the plurality of nodes, and the total volume of data to be read from the logical volume.

5. The data processing method according to claim 1,
wherein the second storage device includes replicas of the logical volume, and
wherein the data entry server calculates times required to read data from the logical volume and from the replicas of the logical volume in parallel, and estimates the processing time required to execute each of the first and second data entry methods using the calculated times.

6. The data processing method according to claim 1,
wherein the data stored in the logical volume includes dereference information for facilitating identification of the data to be read, and
wherein the data entry server calculates a time required to obtain the data to be read using the dereference information, and estimates the processing time required to execute each of the first and second data entry methods using the calculated time.

7. The data processing method according to claim 1,
wherein the computer system includes a plurality of storage devices,
wherein the data to be read is stored across the plurality of storage devices, and
wherein the data entry server calculates a time required to read the data from the plurality of storage devices in parallel, and estimates the processing time required to execute each of the first and second data entry methods using the calculated time.

8. A computer system comprising:
a data entry server;
a plurality of nodes connected to the data entry server via a first network; and
a storage device connected to the data entry server and the plurality of nodes via a second network, the storage device including a logical volume having stored therein at least data as data sources that can be read by each of the plurality of nodes, and the storage device being a non-transitory, tangible computer-readable storage medium,
wherein the storage device storing the logical volume is separated from the plurality of nodes so that the logical volume does not constitute a distributed file system which is composed of the plurality of nodes,
wherein the data entry server estimates a processing time required to execute each of first and second data entry methods, and selects one of the first and second data entry methods based on the estimated processing time,
wherein the data entry server or the plurality of nodes executes data entry processing based on the selected data entry method,
wherein the first data entry method is a method in which the data entry server reads data from the logical volume, divides the data into a plurality of blocks, and sends the data blocks to the plurality of nodes with no overlaps, and

20 wherein the second data entry method is a method in which the plurality of nodes, in response to an instruction from the data entry server, reads the data from the logical volume with no overlaps by dividing the data into a plurality of blocks.

9. The computer system according to claim 8,
wherein the first network is a local area network and the second network is a storage area network,
wherein the first data entry method is a method in which the data entry server obtains all data in a given column of a database included in the logical volume, identifies data to be read using the data in the column, obtains the identified data from the database, and distributes the obtained data to the plurality of nodes, and
wherein the second data entry method includes:
(i) a second A method in which the data entry server obtains all data in a given column of the database included in the logical volume, identifies data to be read using the data in the column, and sends information on the identified data to the plurality of nodes, so that the plurality of nodes obtains the identified data from the database, and
(ii) a second B method in which the plurality of nodes obtains all data in a given column of the database included in the logical volume, identifies data to be read using the data in the column, and obtains the identified data from the database, and
wherein the data entry server estimates a processing time required to execute each of the first, second A, and second B data entry methods using throughput of the local area network, throughput of the storage area network, throughput of the logical volume, the total volume of data to be sent to the plurality of nodes, and the total volume of data to be read from the logical volume, and selects a data entry method with the shortest estimated processing time from among the first, second A, and second B data entry methods.

10. The computer system according to claim 8,
wherein the first data entry method is a method in which the data entry server obtains all data in a given column of the database included in the logical volume, identifies data to be read using the data in the column, obtains the identified data from the database, and distributes the obtained data to the plurality of nodes,
wherein the second data entry method includes:
(i) a second A method in which the data entry server obtains all data in a given column of the database included in the logical volume, identifies data to be read using the data in the column, and sends information on the identified data to the plurality of nodes, so that the plurality of nodes obtains the identified data from the database, and
(ii) a second B method in which the plurality of nodes obtains all data in a given column of the database included in the logical volume, identifies data to be read using the data in the column, and obtains the identified data from the database, and
wherein the data entry server estimates a processing time required to execute each of the first, second A, and second B data entry methods, and selects one of the first, second A, and second B data entry methods based on the estimated processing time.

11. The computer system according to claim 8, wherein the data entry server estimates the processing time required to execute each of the first and second data entry methods using throughput of the first and second networks, throughput of the logical volume, the total volume of data to be sent to the plurality of nodes, and the total volume of data to be read from the logical volume.

12. The computer system according to claim 8,
wherein the second storage device includes replicas of the logical volume, and
wherein the data entry server calculates times required to read data from the logical volume and from the replicas of the logical volume in parallel, and estimates the processing time required to execute each of the first and second data entry methods using the calculated times.

13. The computer system according to claim 8,
wherein the data stored in the logical volume includes dereference information for facilitating identification of the data to be read, and
wherein the data entry server calculates a time required to obtain the data to be read using the dereference information, and estimates the processing time required to execute each of the first and second data entry methods using the calculated time.

14. The computer system according to claim 8,
wherein the computer system includes a plurality of storage devices,
wherein the data to be read is stored across the plurality of storage devices, and
wherein the data entry server calculates a time required to read the data from the plurality of storage devices in parallel, and estimates the processing time required to execute each of the first and second data entry methods using the calculated time.

15. The computer system according to claim 8, further comprising:
a management server that displays a user interface configured to instruct the data entry server to enter data into the plurality of nodes.

* * * * *